(12) United States Patent
Allen

(10) Patent No.: US 10,067,302 B2
(45) Date of Patent: Sep. 4, 2018

(54) FIBER OPTIC WALL JACK

(71) Applicant: COMMSCOPE TECHNOLOGIES LLC, Hickory, NC (US)

(72) Inventor: Barry Wayne Allen, Siler City, NC (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/466,490

(22) Filed: Mar. 22, 2017

(65) Prior Publication Data

US 2017/0276887 A1    Sep. 28, 2017

Related U.S. Application Data

(60) Provisional application No. 62/312,734, filed on Mar. 24, 2016.

(51) Int. Cl.
*G02B 6/38* (2006.01)
*G02B 6/44* (2006.01)

(52) U.S. Cl.
CPC ......... *G02B 6/3897* (2013.01); *G02B 6/3825* (2013.01); *G02B 6/3849* (2013.01); *G02B 6/4466* (2013.01)

(58) Field of Classification Search
None
See application file for complete search history.

(56) References Cited

U.S. PATENT DOCUMENTS

| | | | |
|---|---|---|---|
| 5,317,663 A | 5/1994 | Beard et al. | |
| 5,754,724 A * | 5/1998 | Peterson | G02B 6/4446 |
| | | | 385/135 |
| 8,272,787 B2 * | 9/2012 | Lu | H02G 15/113 |
| | | | 385/135 |
| 9,052,468 B2 * | 6/2015 | Cox | G02B 6/3825 |
| 9,335,488 B2 * | 5/2016 | Chan | G02B 6/3825 |
| 2003/0063865 A1 | 4/2003 | Holmquist | |
| 2014/0321813 A1 | 10/2014 | Lu | |
| 2015/0198770 A1 | 7/2015 | Lu | |
| 2015/0301286 A1 * | 10/2015 | Chan | G02B 6/3825 |
| | | | 385/56 |
| 2017/0276887 A1 * | 9/2017 | Allen | G02B 6/3897 |

FOREIGN PATENT DOCUMENTS

| | | |
|---|---|---|
| WO | 2004/027462 A2 | 4/2004 |
| WO | 2015/144883 A1 | 10/2015 |

OTHER PUBLICATIONS

International Search Report and Written Opinion for Application No. PCT/US2017/023615 dated Jun. 15, 2017.

* cited by examiner

*Primary Examiner* — Tina Wong
(74) *Attorney, Agent, or Firm* — Merchant & Gould P.C.

(57) ABSTRACT

Aspects and techniques of the present disclosure relate generally to fiber wall jacks including connector covers for protecting mating fiber optic connectors or adapters that prevent light emissions from the fiber-optics of the connectors when the adapter is open (i.e., when no mating connector is inserted). The connector covers providing protection of the open end from environmental contamination.

25 Claims, 27 Drawing Sheets

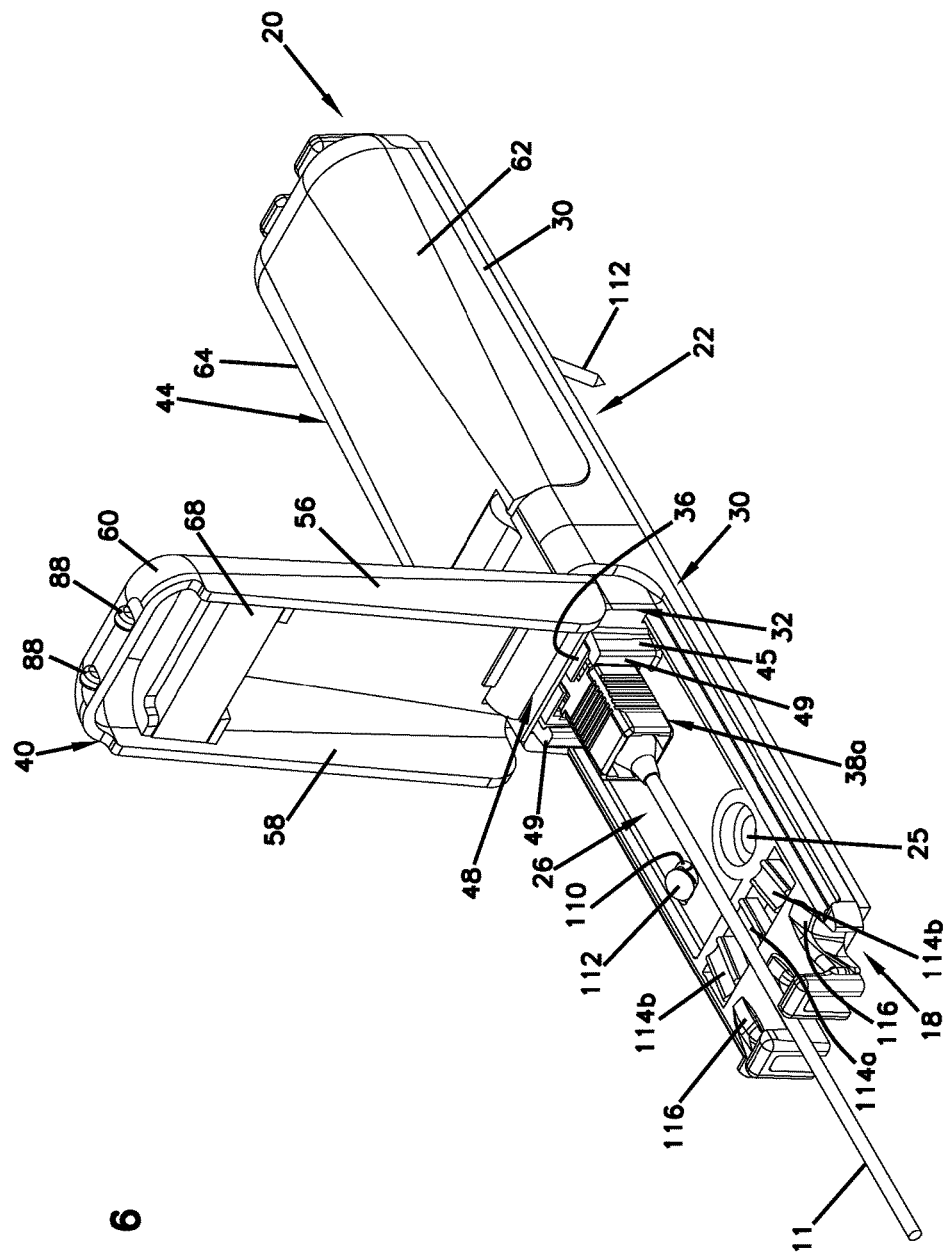

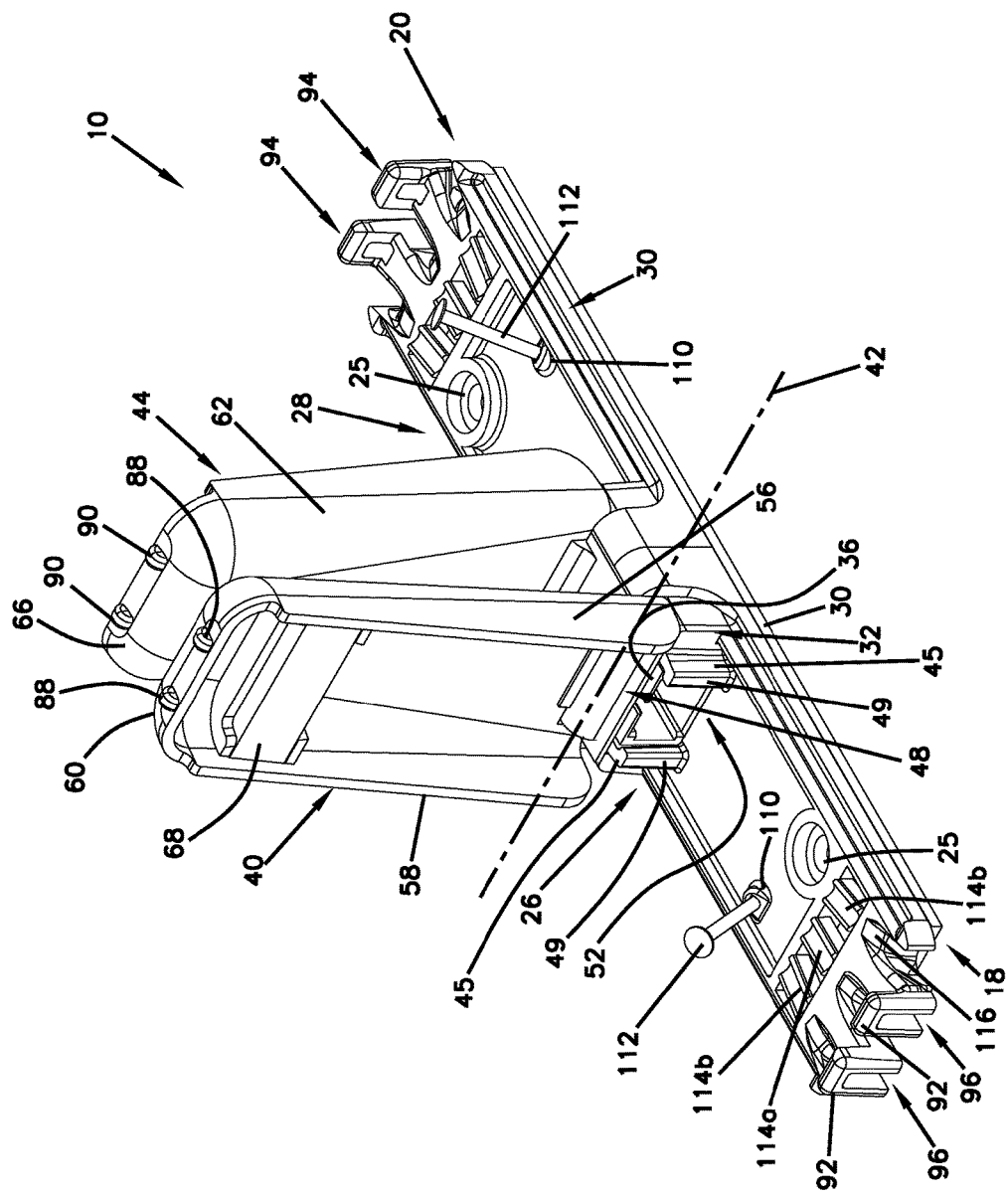

US 10,067,302 B2

FIBER OPTIC WALL JACK

CROSS REFERENCE TO RELATED APPLICATIONS

This application claims the benefit of U.S. Provisional Patent Application No. 62/312,734, filed Mar. 24, 2016, which application is hereby incorporated by reference in its entirety.

TECHNICAL FIELD

The present disclosure relates generally to fiber optic connection devices and housings.

BACKGROUND

There is an increased need to expand optical fiber or cable in rooms of existing buildings, such as residential homes or commercial buildings, to provide data communication with electronic devices. A system and method that enables an installer to easily route optical fiber or cable to make connections that would be aesthetically pleasing in the home, while also protecting the connections, is desirable.

SUMMARY

Fiber optic wall jacks may include connector covers for protecting mating fiber optic connectors or adapters that prevent light emissions from the fiber-optics of the connectors when the adapter is open (i.e., when no mating connector is inserted). The connector covers provide protection of the open end from environmental contamination. The present disclosure relates to light-blocking connector covers that block the opening through which the light signal is transmitted when in a closed position and allow open access to the mating connectors when in an open position.

A fiber optic wall jack and features thereof are described. The fiber optic wall jack can be adapted to protect a junction of two mechanically mated fiber optic connectors in an indoor environment such as a building. In one example, the building can be single family and/or multi-dwelling units. The fiber optic wall jack can be mounted directly to a wall surface. The fiber optic wall jack is arranged and configured to allow access to either side of an optical adapter located therein. The fiber optic wall jack can be configured to provide for pre-positioning of a single connector in the optical adapter and to provide protection of a non-connectorized open end of the optical adapter from environmental contamination and escape of laser light. The non-connectorized open end of the optical adapter positioned within the fiber optic wall jack can be accessible such that a subscriber drop can be added at a future date.

The present disclosure enables an optical fiber or cable to be installed at a customer's premises to make connections quickly and safely.

BRIEF DESCRIPTION OF THE DRAWINGS

FIG. 6 is an isometric view of the fiber wall jack shown in FIG. 4.

FIG. 7 is an isometric view of the fiber wall jack shown in FIG. 6 depicting the second cover in the open position without the fiber optic connector.

DETAILED DESCRIPTION

A feature of the present disclosure relates to a fiber wall jack for making telecommunication connections within a new or existing building. A communication line such as an optical fiber cable can be installed in rooms of an existing building to serve electronic devices. The line can be mounted to a fiber wall jack that is positioned on the walls of the room along the baseboards, around door frames, or in corners, where the visual impact is acceptable and the cost of installation is reasonable.

The fiber wall jack may have a slim profile for flexible mounting along walls in a customer's premises. The fiber wall jack may be mounted using various attachment means including, but not limited to, mechanical fasteners, adhesives, snap-fit connection, combinations thereof, or the like. It will be appreciated that other methods of securement may be used. The fiber wall jack can also have a symmetrical design that allows for connector entry on both ends of the fiber wall jack. The fiber wall jack can include a fiber optic adapter compatible with LP, SC type connectors, or other types of connectors. The connections of the fiber wall jack can be protected by shutter covers pivotally mounted on opposite ends of the fiber wall jack to provide a seal.

Figure 1:
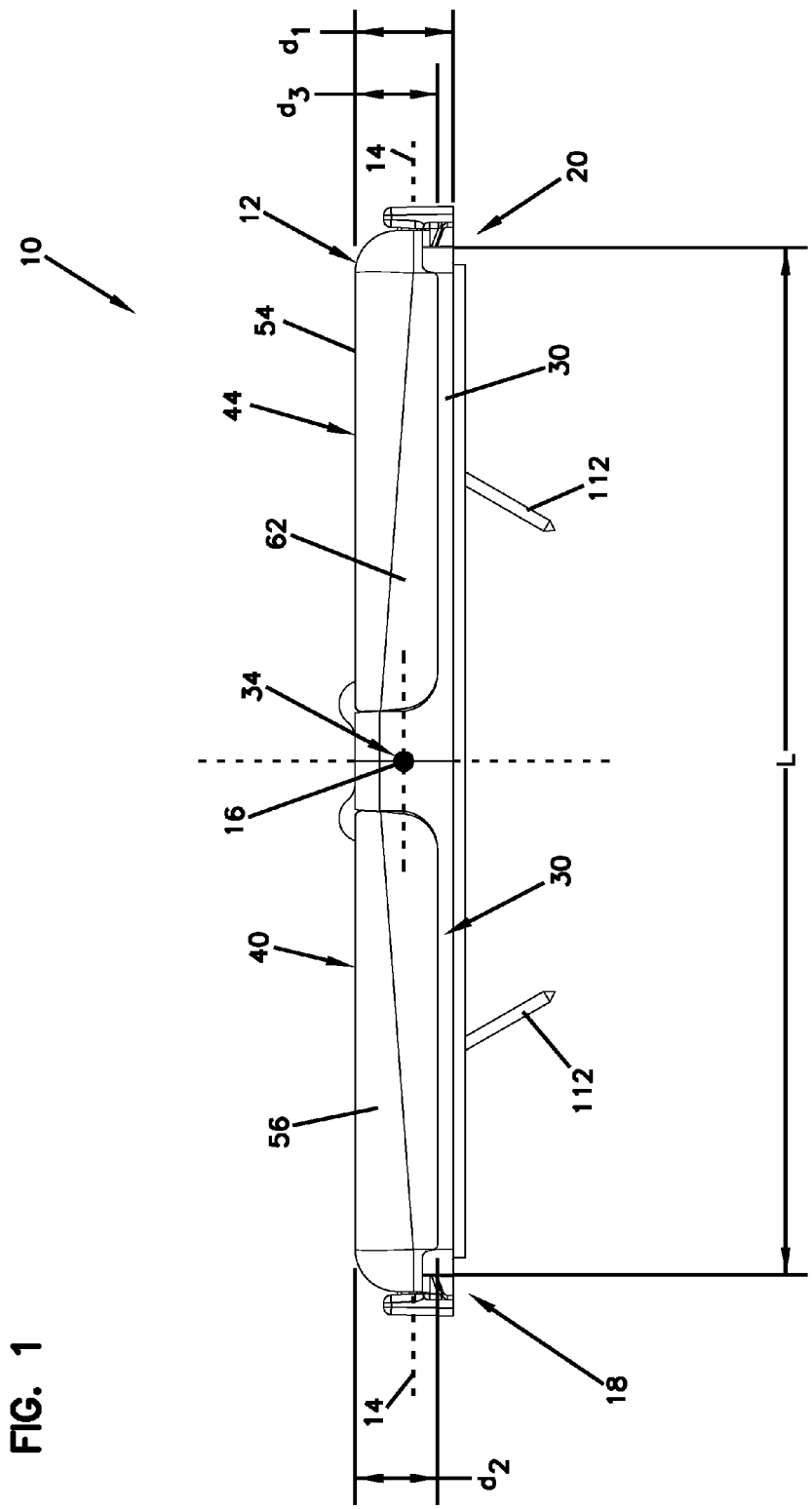
FIG. 1 is a side view of an example fiber wall jack depicting first and second covers in a closed position in accord with the principles of the present disclosure.
Figure 2:
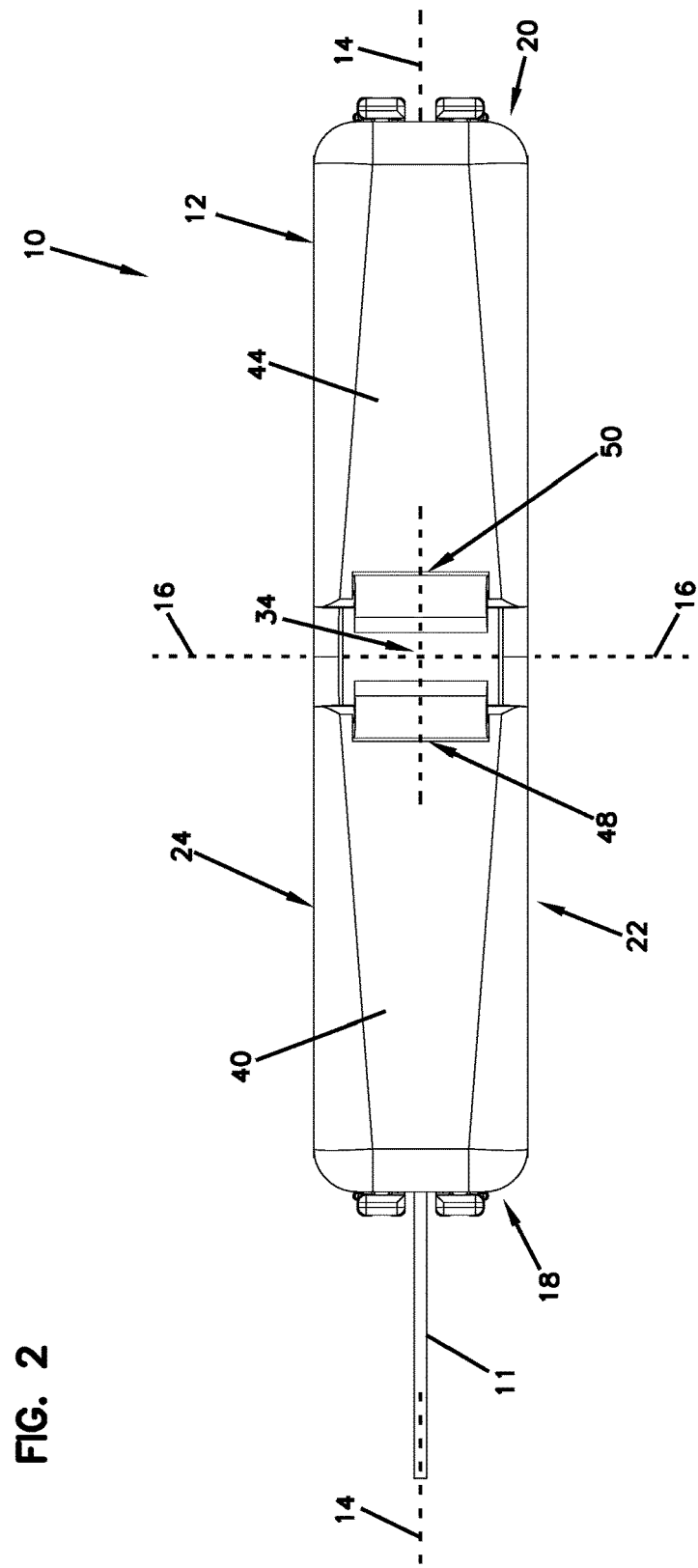
FIG. 2 is a top view of the fiber wall jack shown in FIG. 1 depicting an optical fiber in accord with the principles of the present disclosure.
Figure 3:
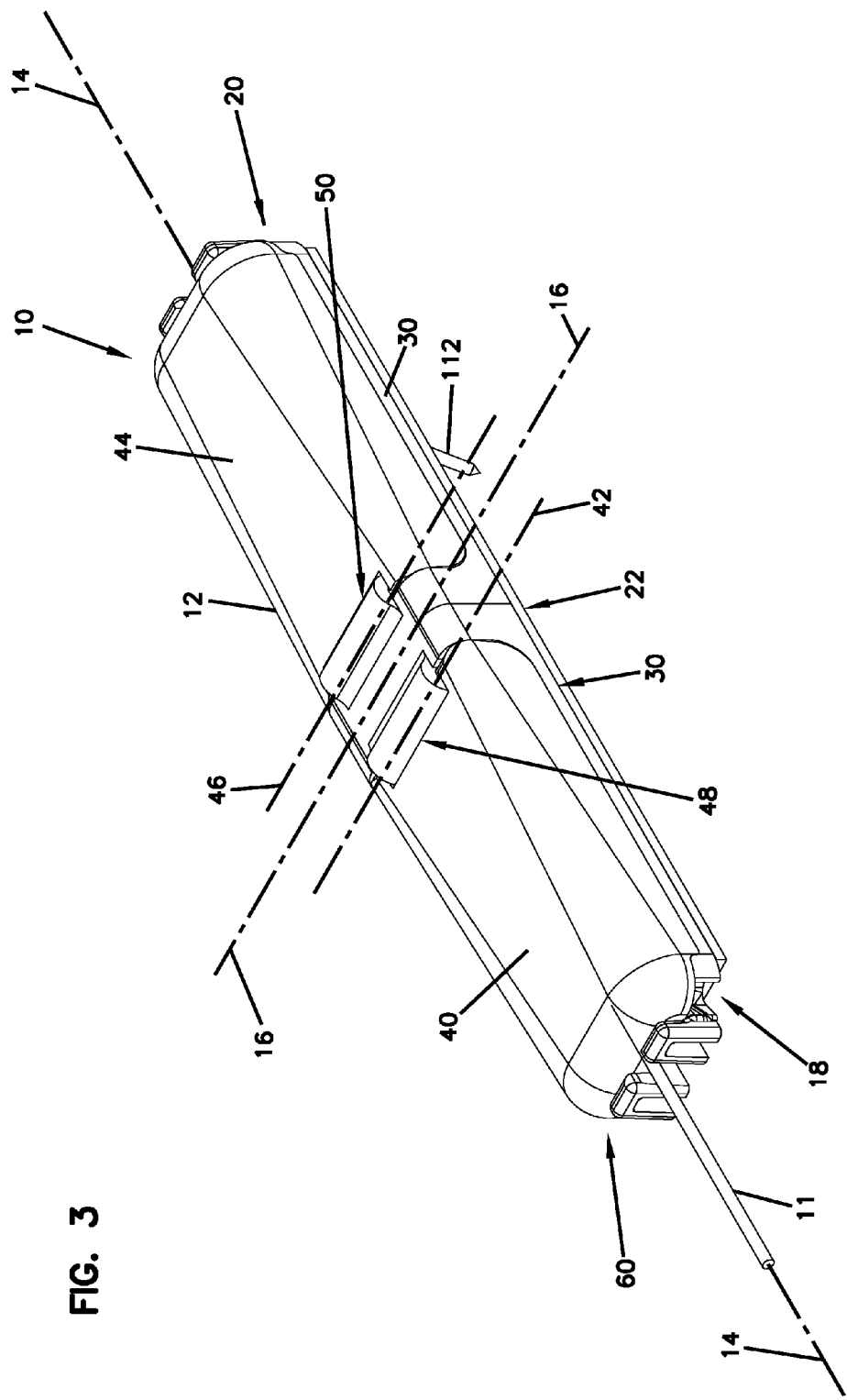
FIG. 3 is an isometric view of the fiber wall jack shown in FIG. 2.

An example fiber wall jack 10 is depicted in FIG. 1. This fiber wall jack 10 includes a housing 12 that defines a major axis 14 and a minor axis 16 (see FIG. 2). The major axis 14 and the minor axis 16 can be perpendicular relative to one another. The example housing 12 is shown symmetrical about the major axis 14 and the minor axis 16. The housing 12 defines a first end 18 and a second opposite end 20 that may be intersected by the major axis 14. The example housing 12 is shown elongated between the first and second ends 18, 20. The example housing 12 has as symmetrical design, although alternatives are possible.

The housing 12 may be may be made from any material including, but not limited to, metals, plastics, ceramics, acrylics, rubber, combinations thereof, or any other solid material. Preferably the housing 12 is made from a molded plastic.

Referring to FIGS. 2-7, the example housing 12 also includes a first side 22 and a second side 24 that are intersected by the minor axis 16. The first and second sides 22, 24 extend between the first end 18 and the second end 20 of the housing 12.

The housing 12 also defines a first connector chamber 26 (see FIG. 4) located between the minor axis 16 and the first end 18 of the housing 12 and a second connector chamber 28 (see FIG. 7) located between the minor axis 16 and the second end 20 of the housing 12.

The example housing 12 includes a base 30 that has a length L that extends from the first end 18 of the housing to the second end 20 of the housing 12. The base 30 also has a width W that extends from the first side 22 of the housing 12 to the second side 24 of the housing 12. The depicted base 30 defines an adapter mount 32 including adapter retention walls 45 (see FIG. 7) with flanges 49 (see FIG. 9). The adapter mount 32 is located at an intersection 34 between the major axis 14 and the minor axis 16. The adapter mount 32 is arranged and configured to receive an optical fiber adapter 36 that snaps into the adapter mount 32 between the adapter retention walls 45. The flanges 49 of the adapter retention walls 45 help to keep the optical fiber adapter 36 from sliding out lengthwise along the major axis 14.

Figure 4:
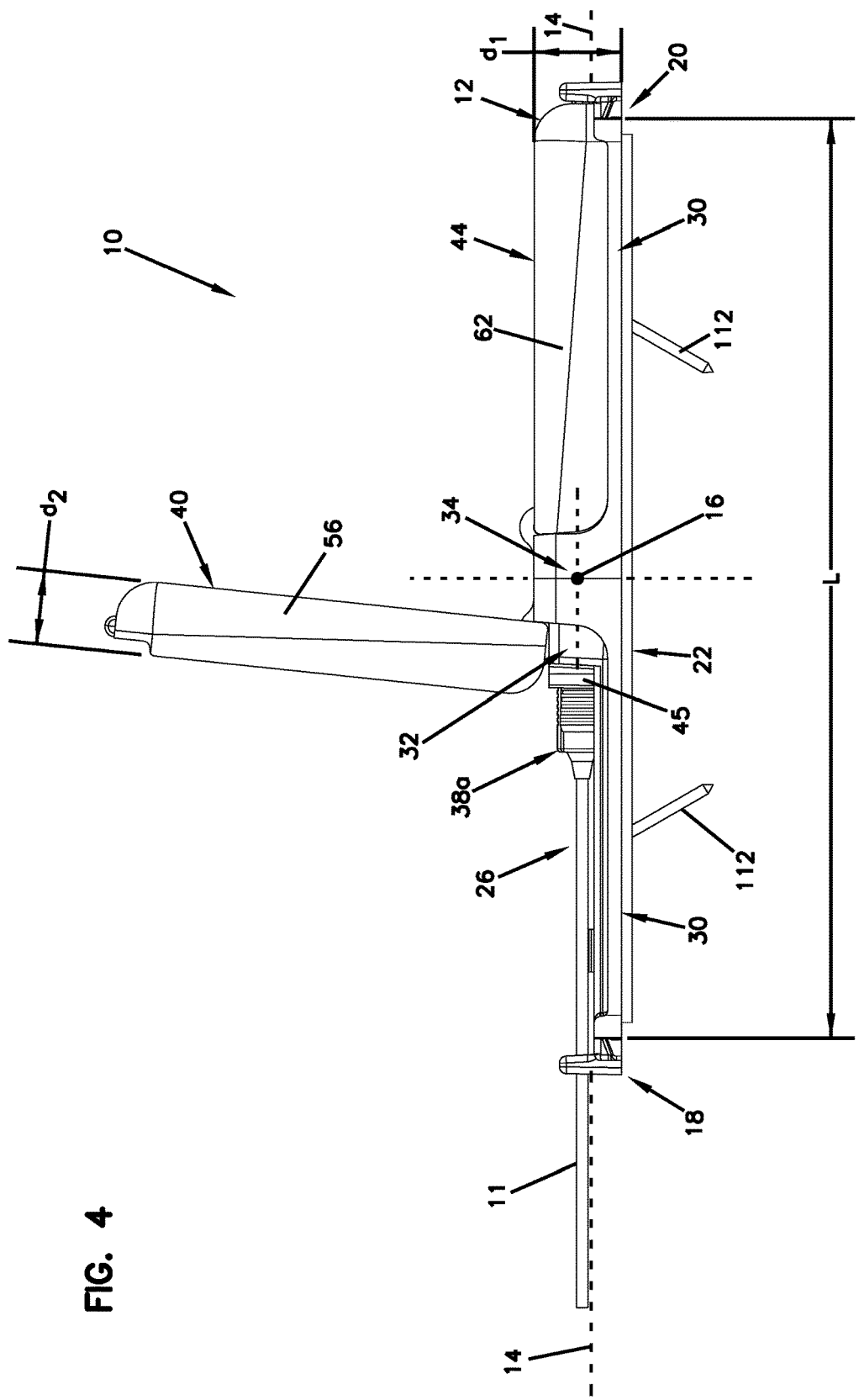
FIG. 4 is a side view of the fiber wall jack shown in FIG. 2 with the first cover in an open position depicting a fiber optic connector in accord with the principles of the present disclosure.
Figure 5:
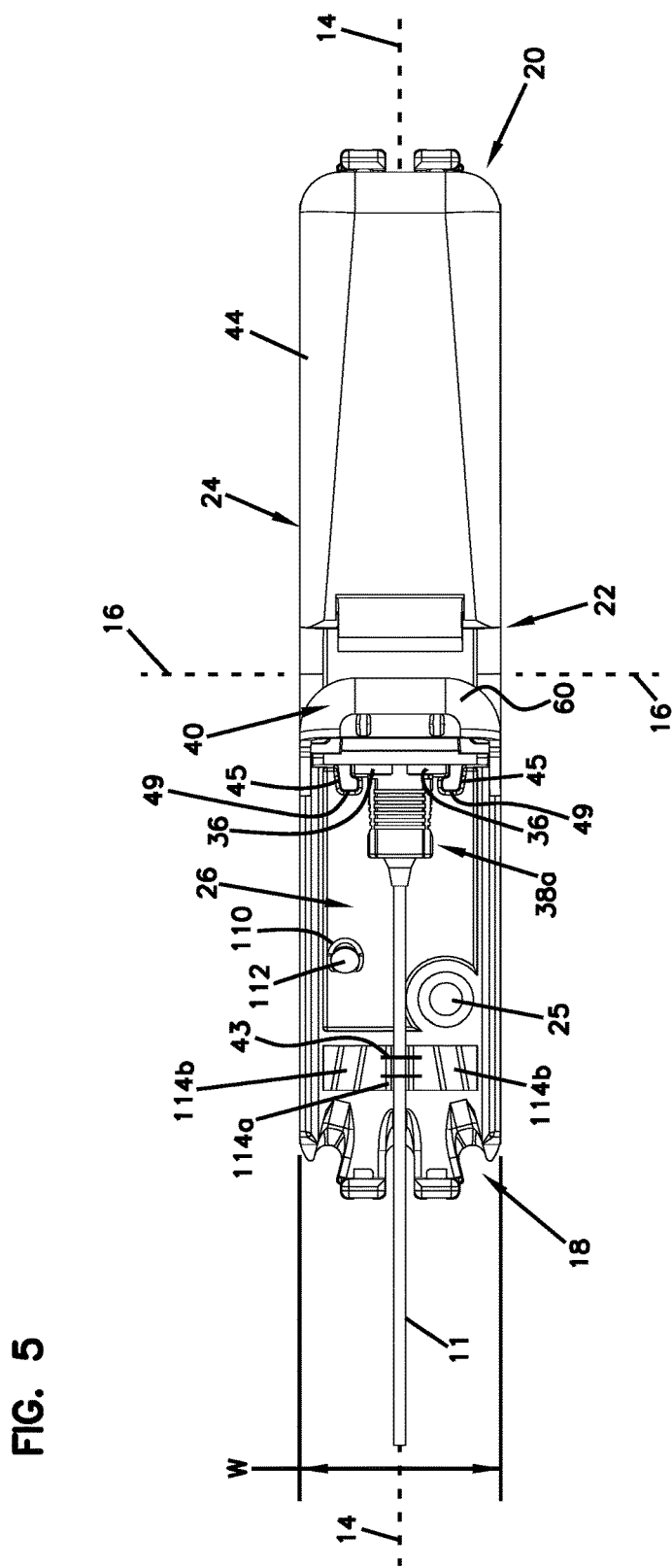
FIG. 5 is a top view of the fiber wall jack shown in FIG. 4.

In FIGS. 4-6, a fiber optic connector 38 is shown having an SC-type intermatability profile. As such, the fiber optic connector 38 can be adapted to be received within an SC-type fiber optic adapter 36 that is used to couple two of the connectors together to provide an optical connection thereinbetween.

In one example, a fiber optic connector 38a can be inserted within the fiber optic adapter 36 such that exterior shoulders of the connector 38a are engaged (i.e., abuts against, mated to) by latches of the fiber optic adapter 36 to retain the fiber optic connector 38a within the fiber optic adapter 36. To release the fiber optic connector 38a from the fiber optic adapter 36, an outer release sleeve of the fiber optic connector 38a can be slid rearwardly to cause the latches of the fiber optic adaptor 36 to disengage from the exterior shoulders such that the fiber optic connector 38a can be withdrawn from the fiber optic adapter 36. An example fiber optic adapter is disclosed at U.S. Pat. No. 5,317,663 which is hereby incorporated by reference in its entirety. It will be appreciated that a variety of other adapters may be used.

The example housing 12 includes a first cover 40 that cooperates with the base 30 to enclose the first connector chamber 26 of the housing 12. The first cover 40 may be pivotally movable about a first pivot axis 42 between an open position (see FIG. 4) and a closed position (see FIG. 1). The first pivot axis 42 can be located adjacent to the minor axis 16 and forms a first pivot connection 48.

As used herein, the term, "adjacent" and variants thereof, in this context, means that the first pivot axis 42 is closer to the minor axis 16 than to the first end 18. The housing 12 also includes a second cover 44 that cooperates with the base 30 to enclose the second connector chamber 28 of the housing 12. The second cover 44 can be pivotally movable about a second pivot axis 46 between an open position (see FIG. 7) and a closed position (see FIG. 1). The second pivot axis 46 can be located adjacent to the minor axis 16 and forms a second pivot connection 50.

As used herein, the term, "adjacent" and variants thereof, in this context, means that the second pivot axis 46 is closer to the minor axis 16 than to the second end 20.

The first and second covers 40, 44 may be made from any material including, but not limited to, metals, plastics, ceramics, acrylics, rubber, combinations thereof, or any other solid material. The first and second covers 40, 44 can each help to prevent dust from entering the first and second connector chambers 26, 28 and light from shining out.

The first and second covers 40, 44 are rotatably mounted on opposite sides of the fiber wall jack 10 at respective first and second ends 18, 20 of the housing 12. As depicted, the first and second pivot axis 42, 46 of the first and second covers 40, 44 are parallel to each other. First and second pivot connections 48, 50 can each be formed by a pivot pin (e.g., see pins 80 integrated with the covers 40, 44) extending therethrough, or alternatively it can be formed in any other known manner.

The fiber optic adapter 36 can define a first connector port 52 (see FIG. 7) accessible from the first connector chamber 26 and a second connector port 53 (see FIG. 10) accessible from the second connector chamber 28.

Figure 7A:
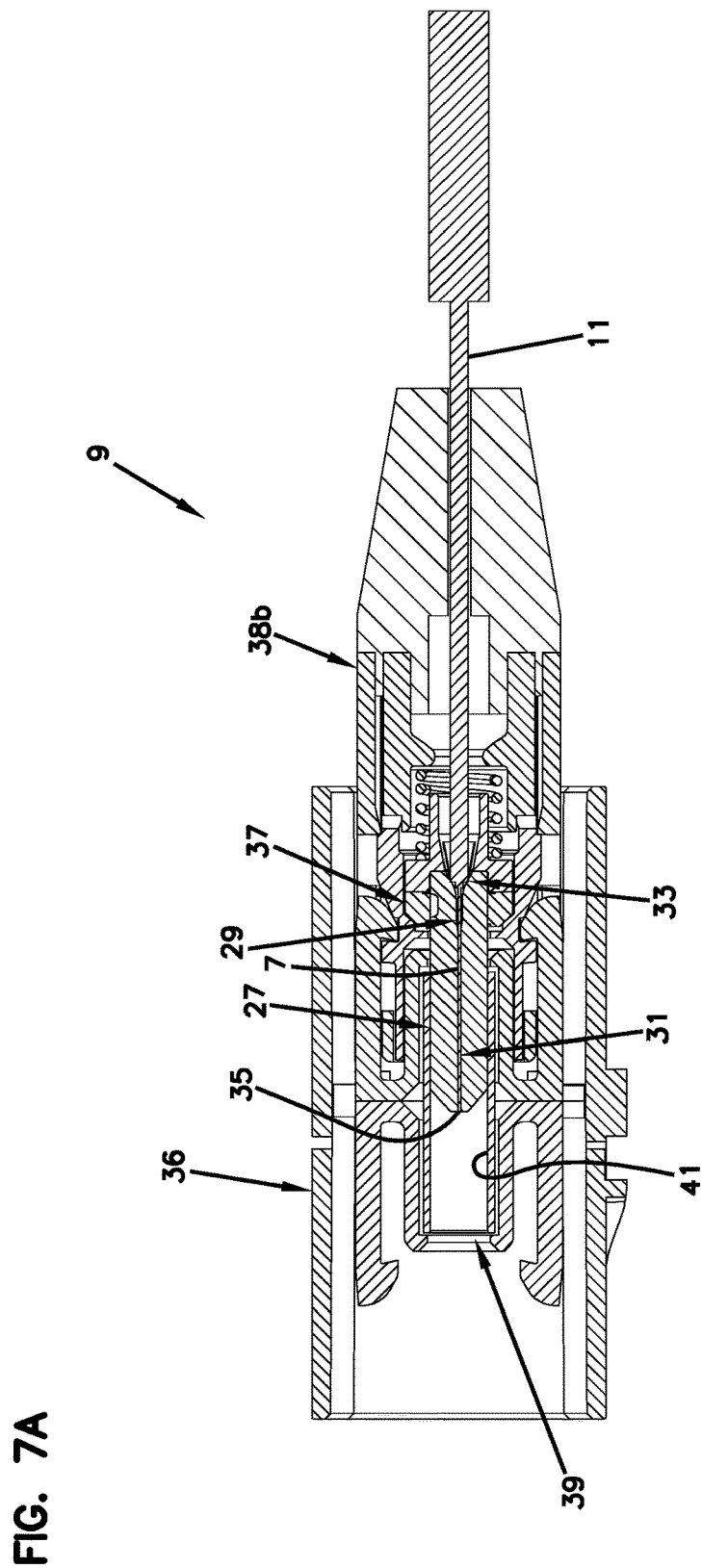
FIG. 7A is a perspective, cross-sectional view of a fiber optic assembly in accord with principles of the present disclosure.

FIG. 7A illustrates one example fiber optic assembly 9 which is suitable for practicing aspects of the present disclosure. The fiber optic assembly 9 includes the fiber optic connector 38b. The example fiber optic connector 38b includes a ferrule 27 and a fiber 7 secured to the ferrule 27. In one example, the ferrule 27 is generally cylindrical. In one example, the ferrule 27 has a diameter in the range of 1-3 millimeters or in the range of 1.25-2.5 millimeters. Example ferrules include SC ferrules and LC ferrules.

The ferrule 27 defines a ferrule bore 29 that extends through the ferrule 27. The fiber 7 includes a first portion 31 secured within the ferrule bore 29 and a second portion 33 that extends rearwardly from a rear end of the ferrule 27. The first portion 31 of the fiber 7 is preferably secured by an adhesive (e.g., epoxy) within the ferrule bore 29 of the ferrule 27. The interface end 35 preferably includes a processed end face accessible at a front end of the ferrule 27. The ferrule 27 includes a ferrule hub 37 mounted to the rear end of the ferrule 27. Generally, the ferrule 27 and ferrule hub 37 are secured together by convenient methods including press fit or adhesive mounts. The fiber optic connector 38 can be one of a variety of well-known connector types, including SC, FC, ST, LX.5, LC, and others.

The ferrule 27 is preferably constructed of a relatively hard material capable of protecting and supporting the first portion 31 of the fiber 7. In one embodiment, the ferrule 27 has a ceramic construction. In other embodiments, the ferrule 27 can be made of alternative materials such as Ultem, thermoplastic materials such as Polyphenylene sulfide (PPS), other engineering plastics or various metals. In one example, the ferrule 50 can be a single fiber ferrule such as a ferrule for and SC connector, and ST connector, or an LC connector. While FIG. 7A depicts a single fiber ferrule, aspects of the present disclosure are also applicable to multi-fiber ferrules such as MT-ferrules and MPO ferrules. A typical multi-fiber ferrule can have a generally rectangular shape and can support a plurality of fibers supported in one or more rows by the multi-fiber ferrule. In certain examples, a fiber optic adapter compatible with multi-fiber connectors can be mounted in the housing 12.

When two fiber optic connectors 38a, 38b are latched within the first and second connector ports 52, 53 of the fiber optic adapter 36, ferrules of the fiber optic connectors 38a, 38b fit within respective first and second ends 39 of a split sleeve 41 and are thereby held in co-axial alignment with one another.

In the closed position, the first connector port 52 is completely covered by the first cover 40 and the second port 53 is completely covered by the second cover 44. The housing 12 can have a depth $d_1$ that extends perpendicularly relative to the length L and the width W from the base 30 to a top surface 54 of the housing 12. The housing 12 of the fiber wall jack 10 has a low, slim profile to provide for less physical interference when mounted. For example, the fiber wall jack 10 will not stick out far form a wall surface and thus will be less likely to be bumped. In one example, the housing 12 can have a length L of at least 110 mm, a width W within a range of 20-30 mm, and a depth $d_1$ within the range of 10-25 mm, although alternatives are possible. In certain examples, the depth $d_1$ is less than the width W and the width W is less than the length L.

The first cover 40 can include a first cover first side wall 56 that defines a portion of the first side 22 of the housing 12 that corresponds with the first connector chamber 26. The first cover 40 may also include a first cover second side wall 58 that defines a portion of the second side 24 of the housing 12 that corresponds with the first connector chamber 26.

The first cover first and second side walls 56, 58 may each have a dimension $d_2$ that extends a majority of the depth $d_1$ of the housing 12 such that when the first cover 40 is in the open position, side access to the first connector port 52 within the first connector chamber 26 is provided. For example, the first cover first and second side walls 56, 58 respectively form a majority of the first and second sides 22, 24 of the housing 12 corresponding with the first connector chamber 26 such that when the first cover 40 is in the open position a majority of the first and second sides 22, 24 of the housing 12 is removed to allow open side access into the first connector chamber 26. As such, there is no interference with the ability to access the fiber optic connector 38a, 38b.

The first cover 40 of the housing 12 further includes a first end wall 60 that extends a majority of the depth $d_1$ such that when the first cover 40 is in the open position end access to the first connector port 52 within the first connector chamber 26 is provided. The first end wall 60 can be integral with (e.g., forming in one piece with) or coupled to, the first cover first and second side walls 56, 58, although alternatives are possible.

The second cover 44 includes a second cover first side wall 62 that defines a portion of the first side 22 of the housing 12 that corresponds with the second connector chamber 28. The second cover 44 also includes a second cover second side wall 64 that defines a portion of the second side 24 of the housing 12 that corresponds with the second connector chamber 28. The second cover first and second side walls 62, 64 each have a dimension $d_3$ that extends a majority of the depth $d_1$ of the housing 12 such that when the second cover 44 is in the open position, side access to the second connector port within the second connector chamber 28 is provided. As such, there is no interference with the ability to access the fiber optic connector therein.

The second cover 44 further includes a second end wall 66 (see FIG. 7) that extends a majority of the depth $d_1$ such that when the second cover 44 is in the open position end access to the second connector port within the second connector chamber 28 is provided. The second end wall 66 can be integral with (e.g., forming in one piece with) or coupled to, the second cover first and second side walls 62, 64, although alternatives are possible.

The first and second covers 40, 44 can each include a dust gasket 68 (e.g., seal member) to seal and help prevent dust from entering the first and second connector chambers 26, 28. The first and second covers 40, 44 each carry the dust gasket 68 within an opening 13 (e.g., receptacle) (see FIG. 9) defined by two arms 15 (e.g., walls) extending from an inner surface 19 of the respective first and second covers 40, 44 across the width of the housing 12 such that when in the closed position the dust gasket 68 helps to prevent dust, liquid, or other elements from entering the first and second connector chambers 26, 28.

Although the dust gasket 68 is shown near the respective first and second ends 18, 20 of the base 30, the dust gasket 68 can be located further inside the respective first and second connector chambers 26, 28 when the first and second covers 40, 44 are in the closed position. The dust gasket 68 can have a resilient/elastomeric construction and can define self-closing slots or openings for receiving fiber optic cables corresponding to the fiber optic connectors. The dust gasket 68 may be comprised of a gel material, although alternatives are possible. For example, the dust gasket 68 may be formed of a foam material.

In other examples, the first and second covers 40, 44 can be used to help secure optical fiber 11 within the first and second connector chambers 26, 28. In the closed position, the first and second covers 40, 44 can block laser radiation exiting the fiber optic adapter 36 when only one connector is plugged into the adapter thereby preventing it from harming a person's eyes.

Figure 8:
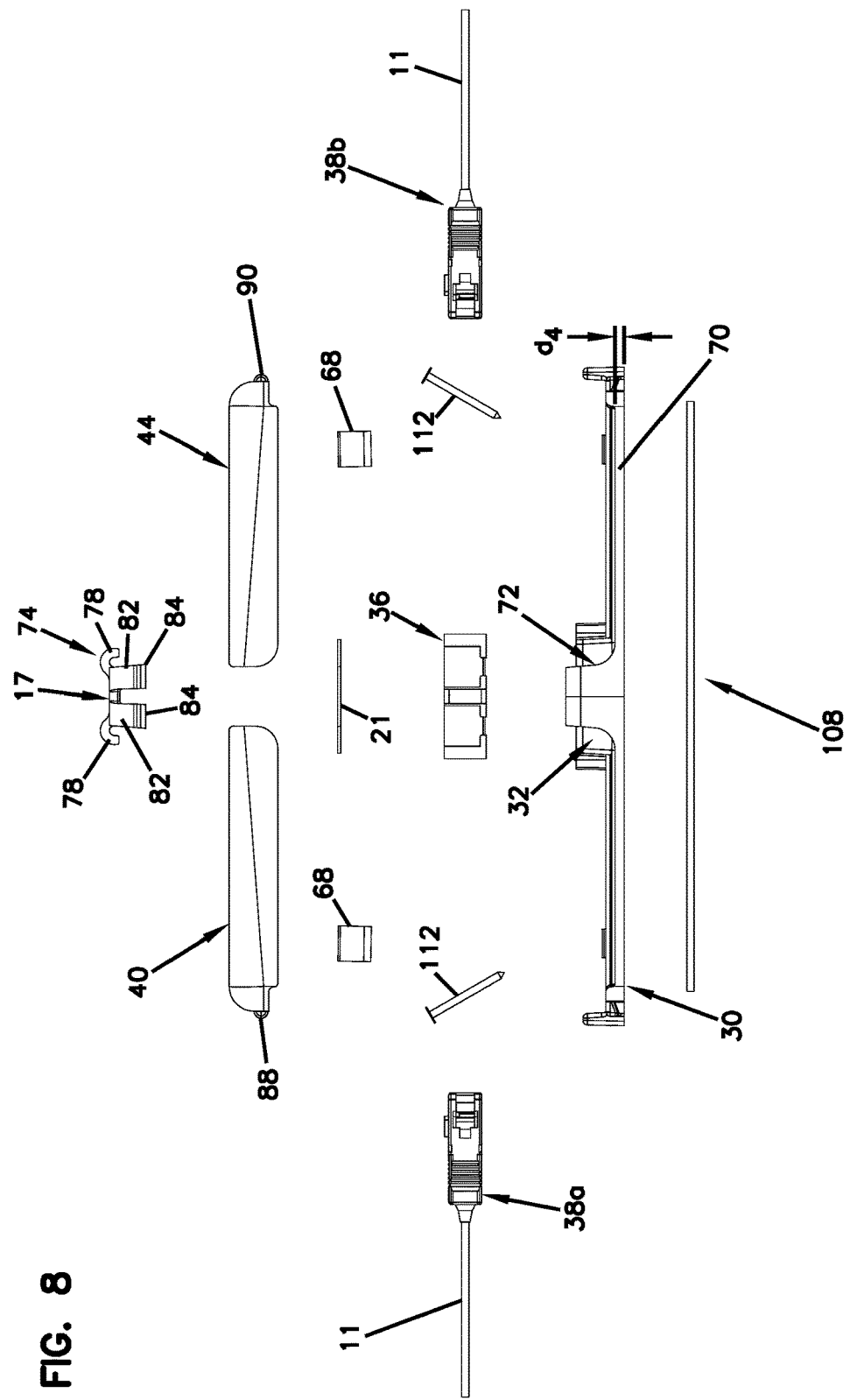
FIG. 8 is an exploded side view of the fiber wall jack shown in FIG. 1 depicting two fiber optic connectors in accord with the principles of the present disclosure.
Figure 9:
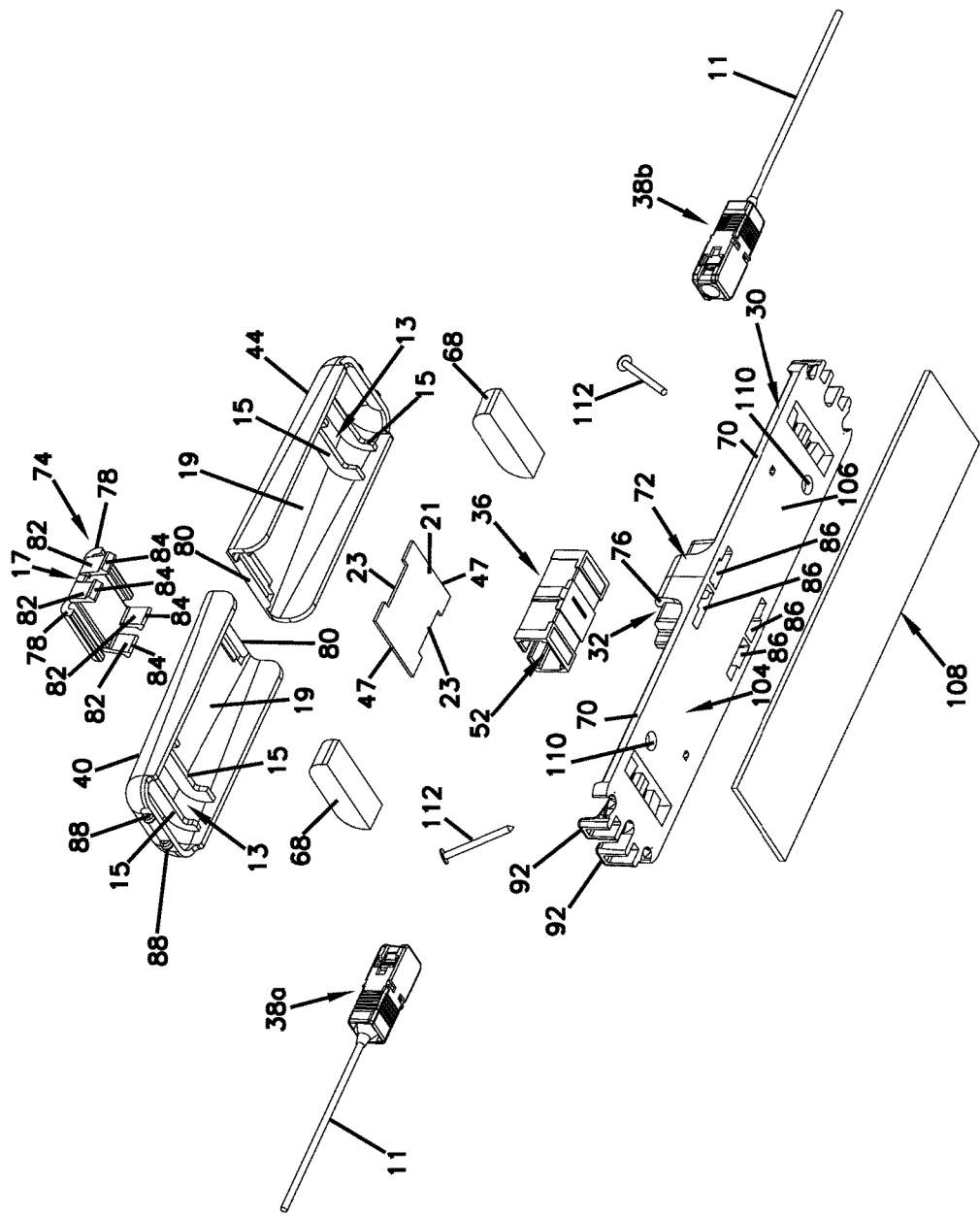
FIG. 9 is an exploded bottom view of the fiber wall jack shown in FIG. 8.
Figure 10:
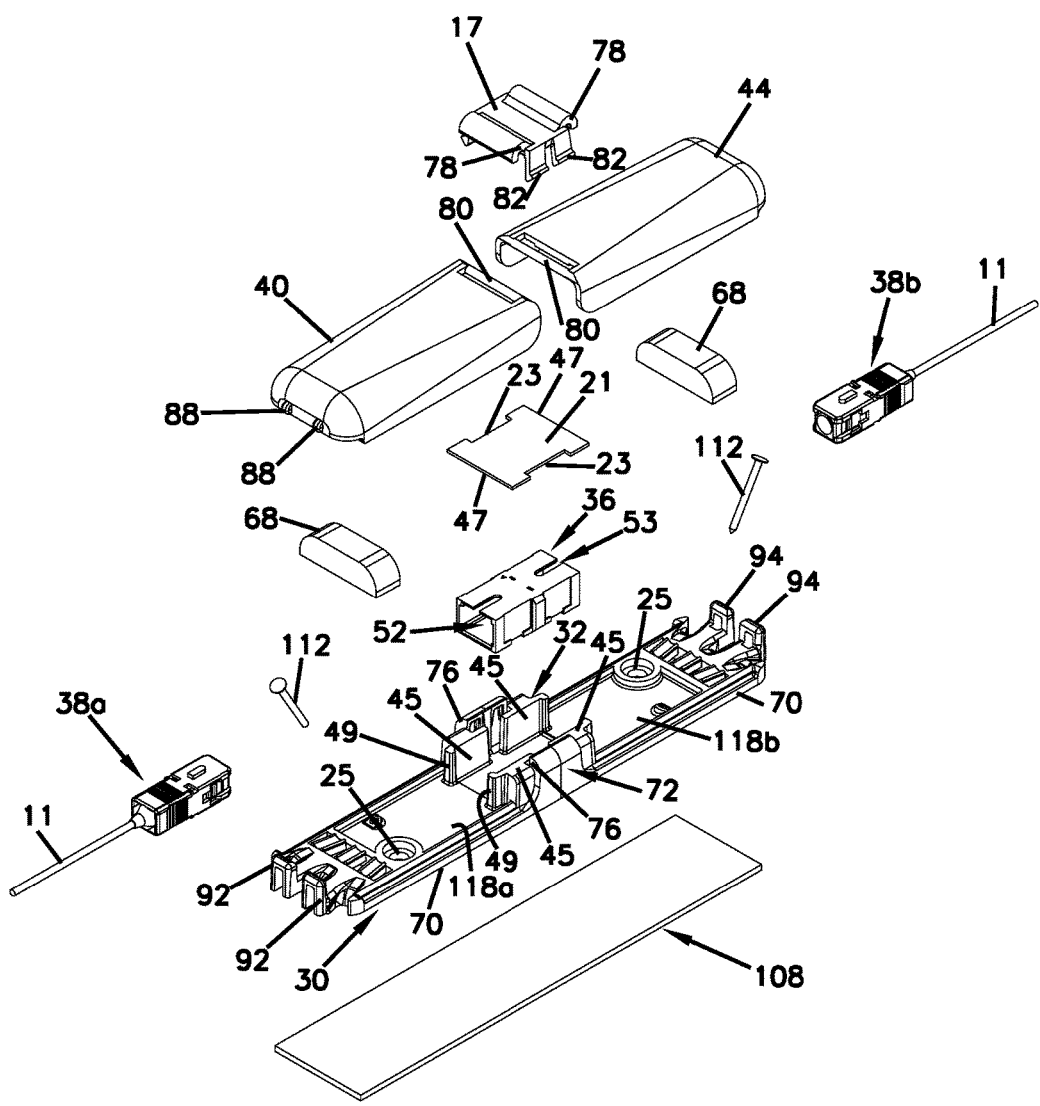
FIG. 10 is an exploded isometric view of the fiber wall jack shown in FIG. 8.

Referring to FIGS. 8-10, exploded views of the fiber wall jack 10 are depicted. The base 30 includes a side wall 70 that has a base depth $d_4$ that extends a minority of the depth $d_1$ of the housing 12. The side wall 70 of the base 30 has a middle section member 72 that extends the full depth $d_1$ of the housing 12. The fiber wall jack 10 can further include a retention clip 74 mountable between the middle section member 72 and the adapter mount 32. The middle section member 72 defines a mounting structure that has latch arms 76 adapted to engage (i.e., abuts against, mated to snap-over) an upper portion 17 of the retention clip 74 to help secure the retention clip 74 on the base 30 of the housing 12.

In one example, the retention clip 74 includes lip portions 78 that extend inwardly from opposite side edges thereof to capture/overlie a pivot pin 80 of the first and second covers 40, 44 when respectively associated therewith. The pivot pin 80 of the first and second covers 40, 44 can be integral with (e.g., forming in one piece with) or coupled to, the first and second covers 40, 44, although alternatives are possible. The opposing lip portions 78 of the retention clip 74 and the pivot pins 80 of the first and second covers 40, 44 together form respective first and second attachment mechanisms. The lip portions 78 of the retention clip 74 respectively mount the first and second covers 40, 44 for pivotable movement about the pivot pins 80.

The retention clip 74 also includes a pair of two spaced apart legs 82 with latch members 84 (e.g., hooks) to secure the retention clip 74 on the base 30 of the housing 12. The base 30 defining apertures 86 (see FIG. 9) for receiving the latch members 84 of the legs 82 of the retention clip 74.

The fiber wall jack 10 may optionally include a plate 21 defining recesses 23 located on opposite sides of the plate 21 and opposing flanges 47 (see FIG. 10). The plate 21 can be configured to rest upon the adapter mount 32 between the fiber optic adapter 36 and retention clip 74. The flanges 47 help to provide support for the pivot pins 80 which are captured between lip portions 78 of the retention clip 74 and the flanges 47 of the plate 21. The plate 21 can rest on upper ends of the adapter retention walls 45. The plate 21 may be H-shaped with recesses 23, although alternatives are possible, to provide spacing for the latch arms 76 of the middle section member 72 and the upper portion of the retention clip 74 when the retention clip 74 is attached or mounted to the base 30. The plate 21 may be a center foam piece to help seal the first and second cover 40, 44 hinge area. Although the retention clip 74 is shown secured to the base 30 of the housing 12 by snap fit connection, alternatives are possible. It will be appreciated that many variations in the clip design other than the embodiment disclosed herein will be apparent to those skilled in the art and are contemplated within the scope of the present invention.

The clip of the present disclosure may be constructed in various sizes according to their intended function. The clips can be made from metals, plastics, ceramics, acrylics, rubber, combinations thereof, or any other solid material. The clips may also be cast or machined from solid polymeric materials.

Figure 11:
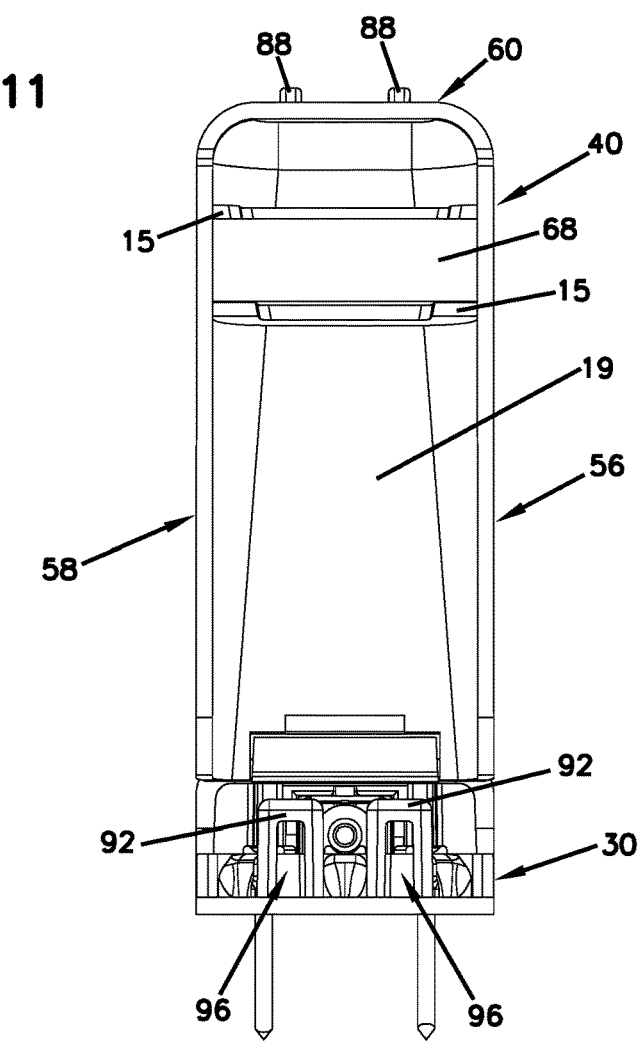
FIG. 11 is an end view of the fiber wall jack shown in FIG. 4.
Figure 12:
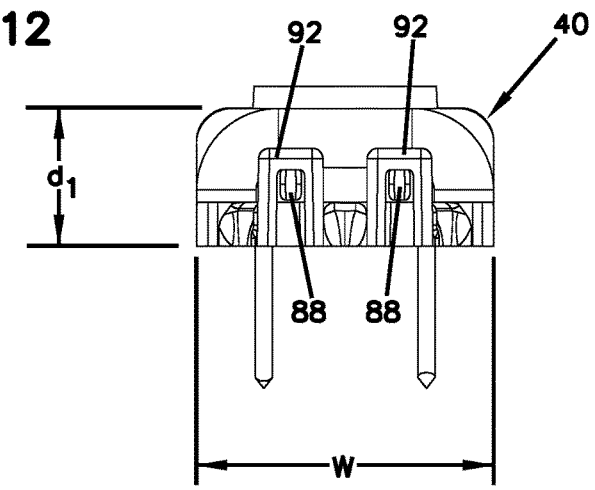
FIG. 12 is an end view of the fiber wall jack shown in FIG. 1.
Figure 13:
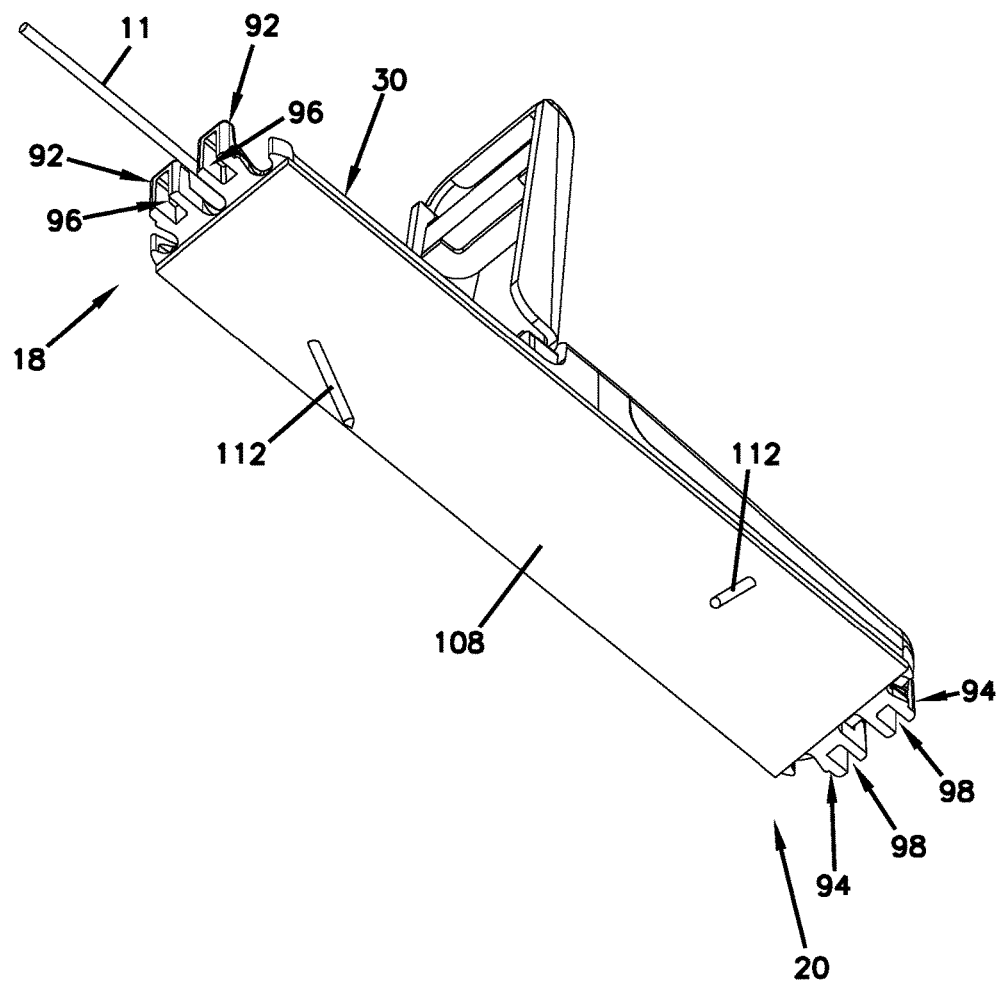
FIG. 13 is a bottom isometric view of the fiber wall jack shown in FIG. 4.

Referring to FIG. 11, a perspective end view of the fiber wall jack 10 is depicted. The first and second covers 40, 44 each include respective first and second lock protrusions 88, 90 (see FIG. 7) arranged on the first and second end walls 60, 66 respectively. Although the first cover 40 is shown, it will be appreciated that similar features are applicable to the second cover 44. The base 30 includes first and second latch portions 92, 94 (see FIG. 13) at respective first and second ends 18, 20 that each define first and second latch spaces 96, 98 for respectively receiving the first and second lock protrusions 88, 90 of the first and second covers 40, 44 (e.g., via a snap-fit) when in the closed position. The first lock protrusion 88 of the first cover 40 and the first latch portion 92 of the base 30 together forms a first latching end 100 when the first cover 40 latches down over the first end 18 of the base 30. The second lock protrusion 90 of the second cover 44 and the second latch portion 94 of the base 30 together forms a second latching end 102 when the second cover 44 latches down over the second end 20 of the base 30. It is to be understood that a variety of different ways may be used for securing the first and second covers 40, 44 to the base 30. For example, the first and second covers 40, 44 can be attachable to the base 30 via at least one of a snap fit, friction fit, a latch fit, a sliding fit, a fastener, a screw, and/or a hinge.

The first and second latch portions 92, 94 of the base 30 may be formed from any suitable material with plastic being a desirable material. The first and second latch portions 92, 94 can be formed as a single piece with the base 30 and when formed from plastic, can be integrally molded.

The first and second lock protrusions 88, 90 may be formed from any suitable material with plastic being a desirable material. The first and second lock protrusions 88, 90 can be formed as a single piece with the first and second covers 40, 44 respectively and when formed from plastic, can be integrally molded.

Turning again to FIG. 9, the base 30 of the housing 12 has a bottom wall 104 with a mounting surface 106 adapted to be adhesively secured to a wall surface (not shown) through an adhesive bonding layer 108, although alternatives are possible. Many types of adhesives are suitable for this purpose. For example, the adhesive bonding layer 108 may be a double-sided polyurethane foam tape. In another example, the adhesive bonding layer 108 may be a pressure sensitive double-sided acrylic tape. Where using a double-sided tape, one side may be bonded to a wall surface, and the other side may be bonded to the mounting surface 106 of the fiber wall jack 10. In certain examples, a liquid or semi-liquid adhesive may be applied to the mounting surface 106 rather than a tape. The adhesive bonding layer 108 may be additionally provided with a release liner (not shown) for protecting the adhesive prior to application. The release liner may be made from a variety of materials, such as polyethylene, provided they are compatible with the underlying adhesive bonding layer 108.

In other examples, the base 30 can define at least one mounting hole 110 configured to allow a fastener device 112 (e.g., a nail, screw or bolt) to slide in the mounting hole 110 to anchor the fiber wall jack 10 to a wall surface. The mounting hole 110 is angled at an oblique angle relative to the mounting surface 106 of the base 30. It will be appreciated that multiple mounting techniques may be used in conjunction with one another or separately. The adhesive bonding layer 108 may also act as a dirt trap within opening 25 (see FIG. 5) defined in the base 30. The opening 25 can be used to receive larger fasteners such as bolts or screws. When a screw passes through the opening 25 and into a wall, debris generated by screwing or drilling is captured or contained by the adhesive bonding layer 108.

Referring to FIGS. 5-7, 19, 23 and 24 one or more channels 114 can be formed in the base 30 of each of the first and second connector chambers 26, 28. The one or more channels 114 are shown with a center channel 114a and side channels 114b on opposite sides thereof. The side channels 114b are angled relative to the major axis 14 and the center channel 114a is parallel relative to the major axis 14, although alternatives are possible. The side channels 114b are configured to provide a transition to respective sides of the 22, 24 of the fiber optic jack 10. The center 114a channel is configured to provide a transition to the bottom wall 104 of the base 30 and over to either side 22, 24 thereof. FIGS. 14-17 show another example configuration of the channels 114 which are all parallel to the major axis 14. The benefit or advantage of having an angled channel is that it allows for the ability to translate the optical fiber out without having to make an abrupt bend when routing the optical fiber 11 out of the fiber wall jack 10.

As depicted, only the first connector chamber 26 is shown, but the second connector chamber 28 includes similar features and advantages. Each of the channels 114 may terminate adjacent a bend radius surface 116 that respectively provides a transition from a front surface 118a, 118b (see FIG. 19) of the respective first and second connector chambers 26, 28 to the base 30 of the housing 12. The bend radius surface 116 can provide a transition down to a location coplanar with the bottom wall 104 of the base 30 such that the optical fiber 11 can be routed to a baseboard of a wall. In certain examples the optical fiber 11 can be routed from transition through a wall where a hole is provided in the wall.

Figure 14:
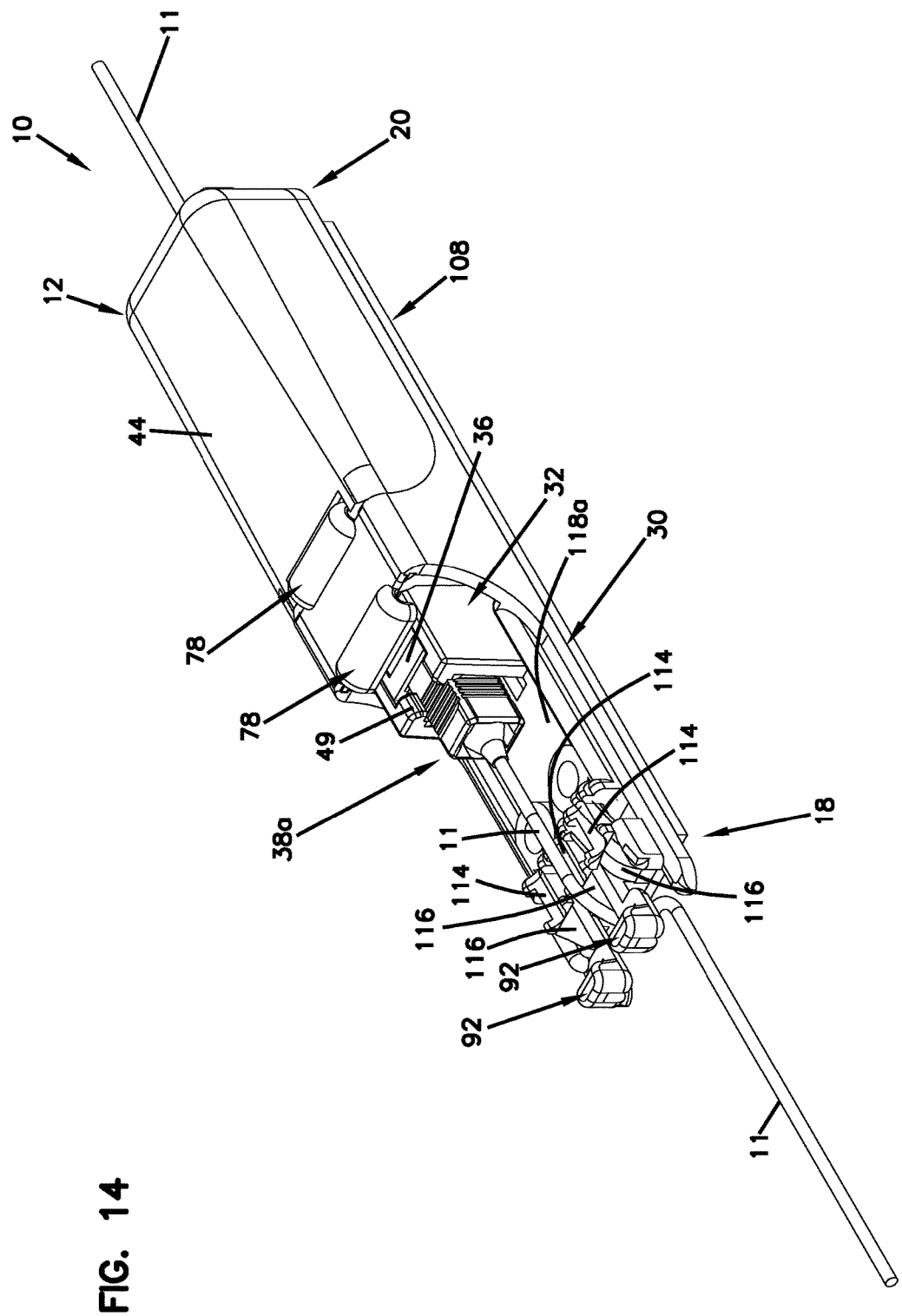
FIG. 14 is an isometric view of the fiber wall jack shown in FIG. 6 with the first cover removed and a fiber optic connector positioned in the second cover.
Figure 15:
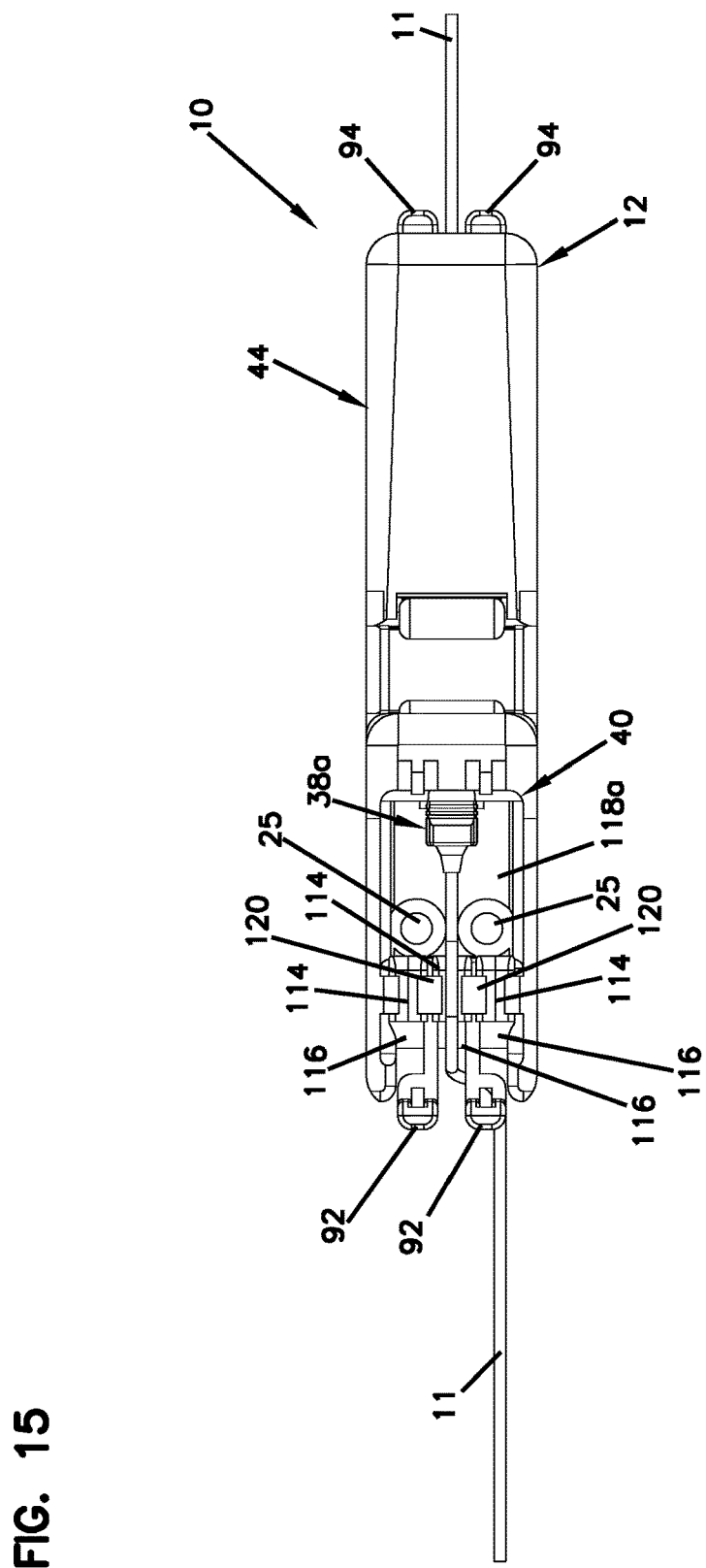
FIG. 15 is top view of the fiber wall jack shown in FIG. 14.
Figure 16:
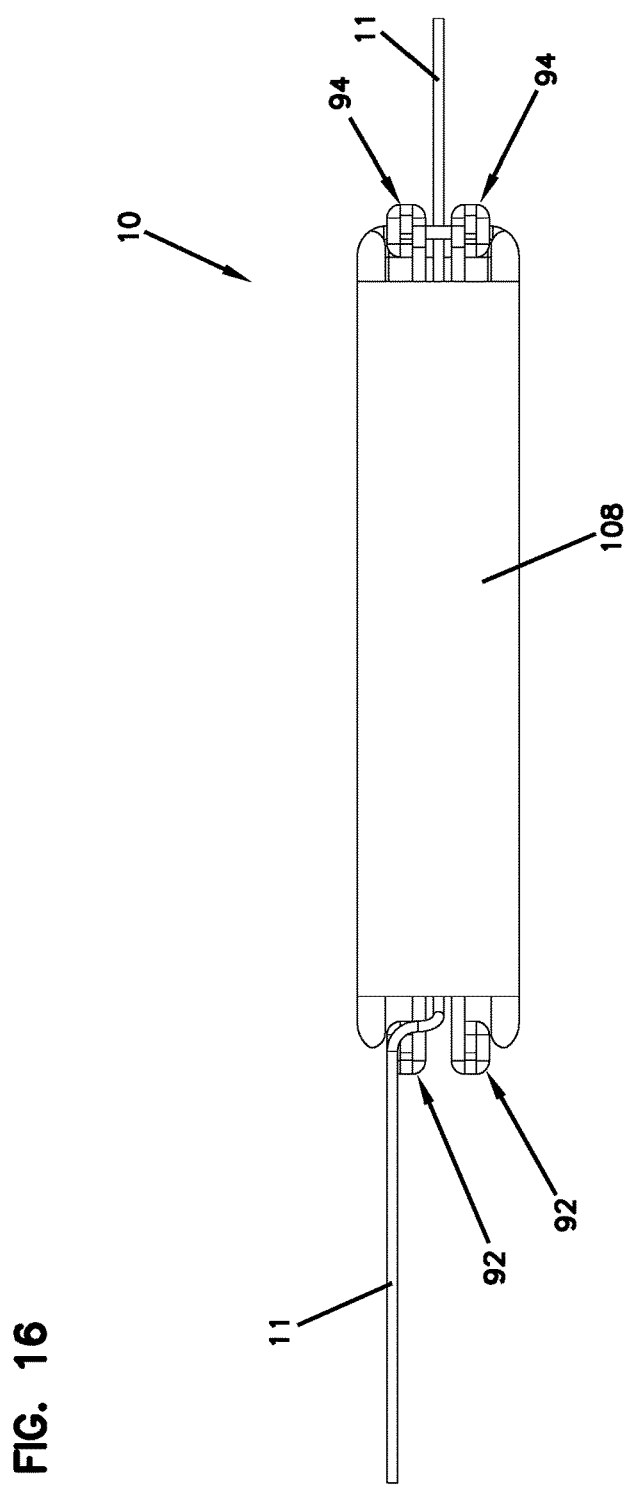
FIG. 16 is a bottom view of the fiber wall jack shown in FIG. 14.
Figure 17:
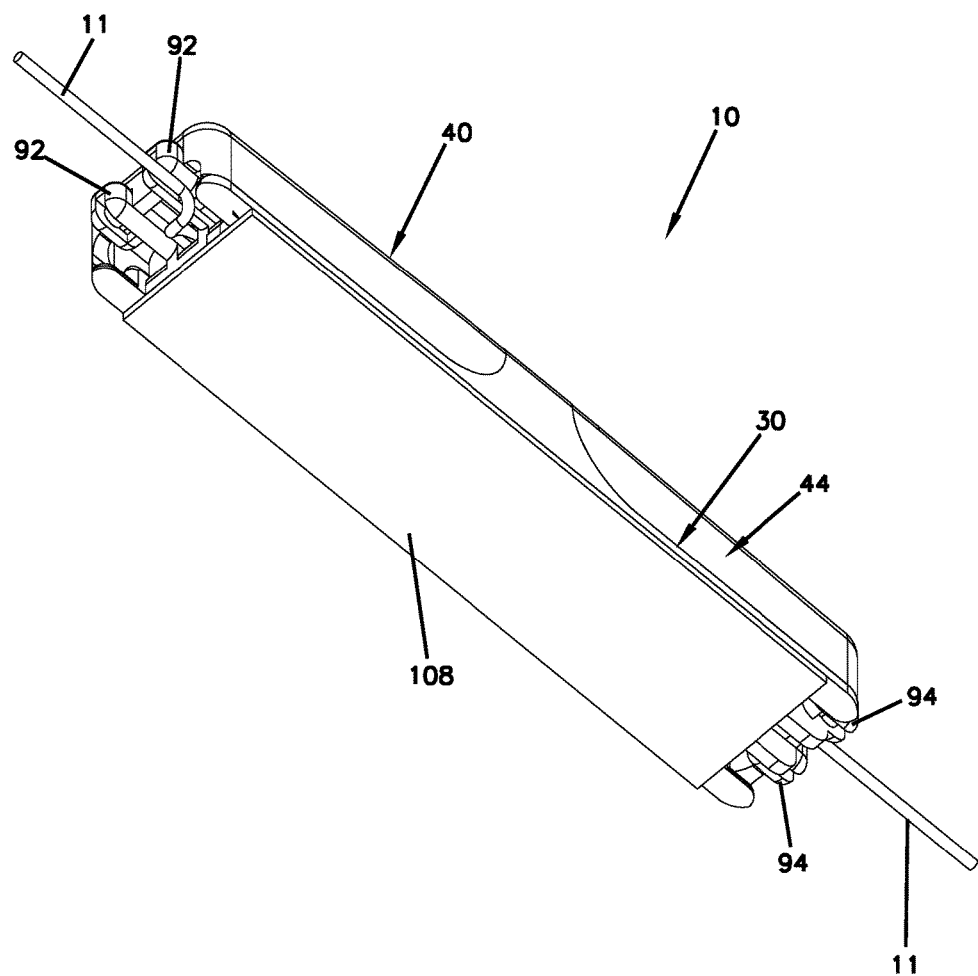
FIG. 17 is an isometric bottom view of the fiber wall jack shown in FIG. 14.

In FIG. 14, the optical fiber 11 is shown routed through a center channel 114 over the bend radius surface 116 and curves under at least one of the latch portions 92 of the base 30, although alternatives are possible. For example, the optical fiber 11 can be routed straight out perpendicularly to a wall surface to be routed therein. The bend radius surface 116 is within the first connector chamber 26 such that a loop of the optical fiber 11 can be therein to prevent any outside snag thereon. The optical fiber 11 can be fixed to a wall along a base board with attachment means, such as, adhesive, staples, etc.

The second connector chamber 28 shows a configuration of the optical fiber 11 that is routed over a bend radius surface 116 and extends straight out a center channel 114 of the second connector chamber 28 without running underneath the latch portion 94 of the base 30 to be placed along a baseboard of a wall. It will be appreciated that other variations for routing the optical fiber 11 from the first and second connector chambers 26, 28 may be used such that multiple paths are feasible for routing the optical fiber 11 along a base board. The optical fiber 11 may be routed through a side channel 114 (e.g., edge, corner) or a center channel 114 of the first and second connector chambers 26, 28.

In certain examples, the optical fiber 11 can be anchored to the fiber wall jack 10 using a tie 43 (see FIG. 5) (e.g., zip tie, etc.) that can be secured through tie down locations 120 (e.g., openings) defined in the base 30. The tie 43 can wrap around channels 114 of the base 30 to anchor the optical fiber 11. The fiber wall jack 10 includes a gap between the bottom wall 104 and the adhesive bonding layer 108 such that the tie 43 may be wrapped through and around the tie down locations 120 without interference.

Figure 18:
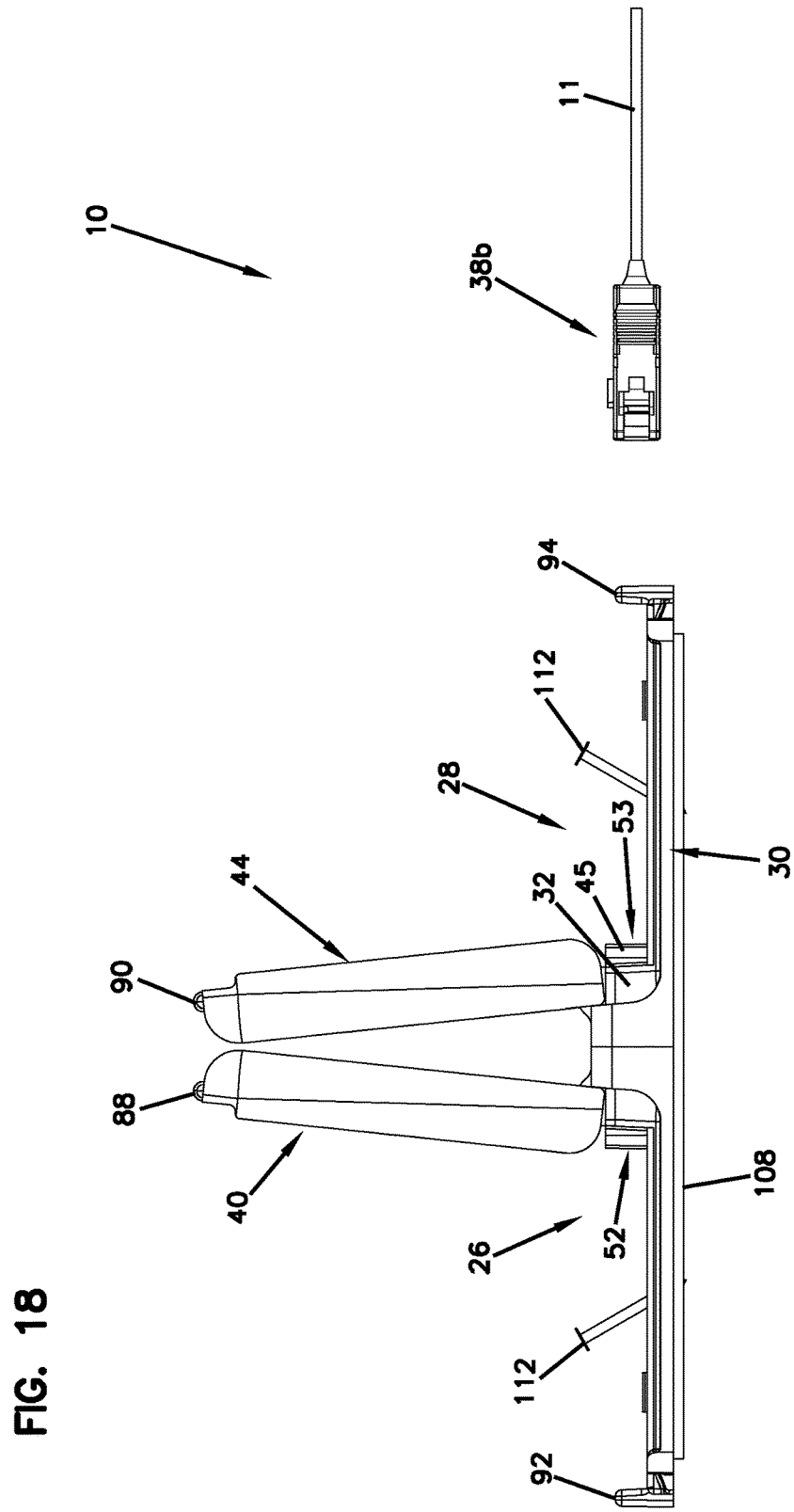
FIGS. 18-27 depict the installation steps of the fiber wall jack shown in FIG. 1 in accord with principles of the present disclosure.
Figure 19:
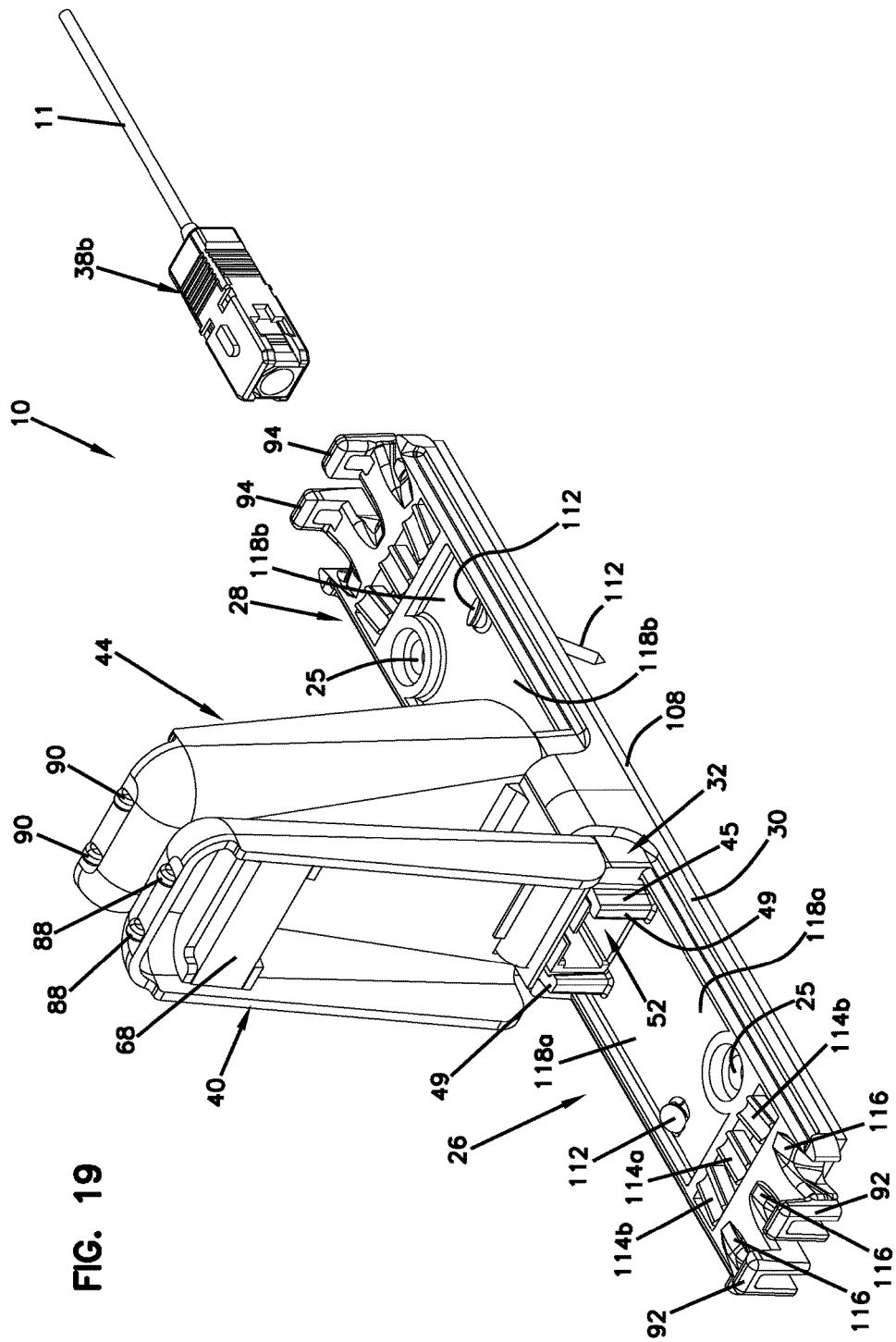
Figure 20:
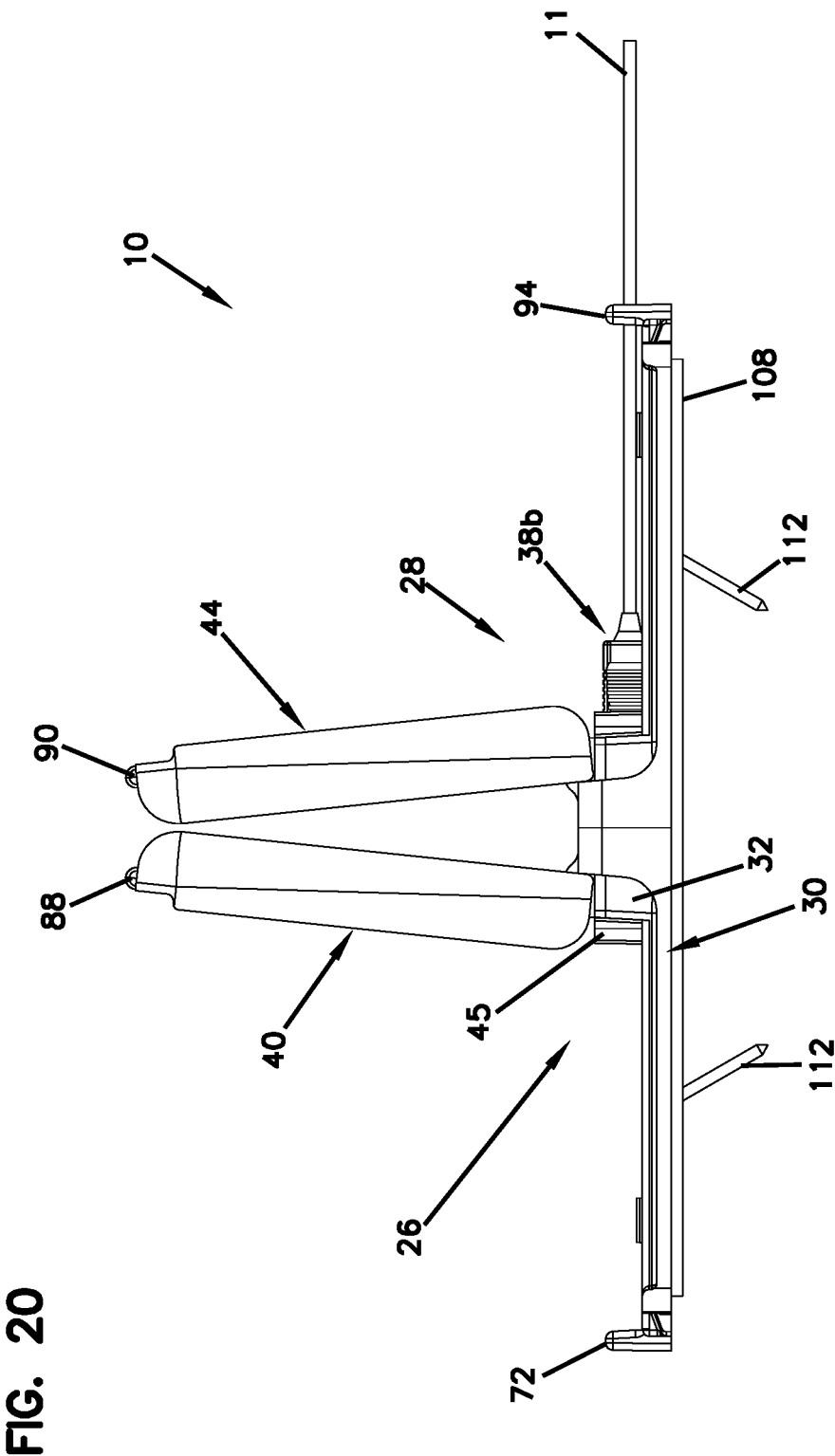
Figure 21:
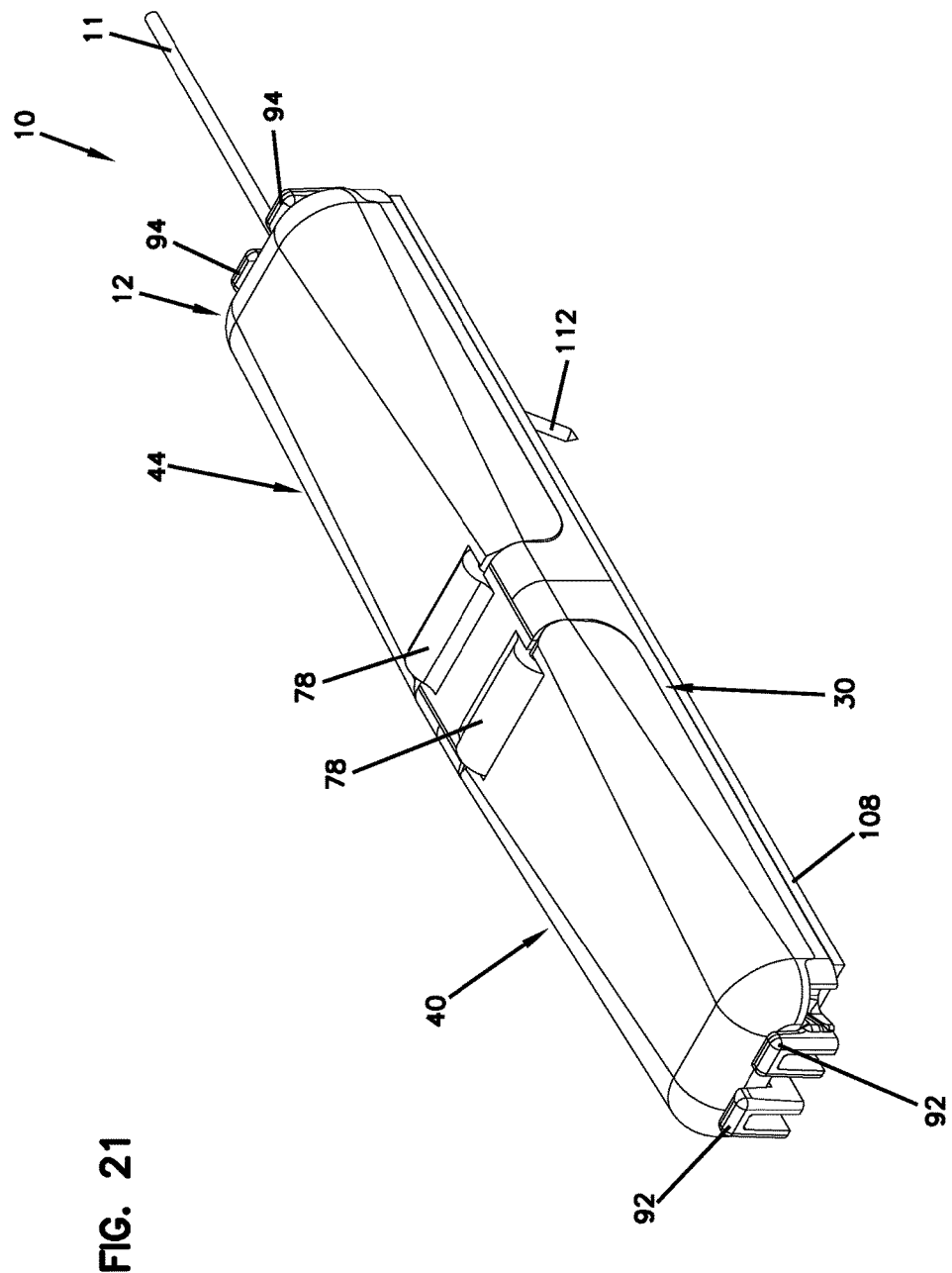
Figure 22:
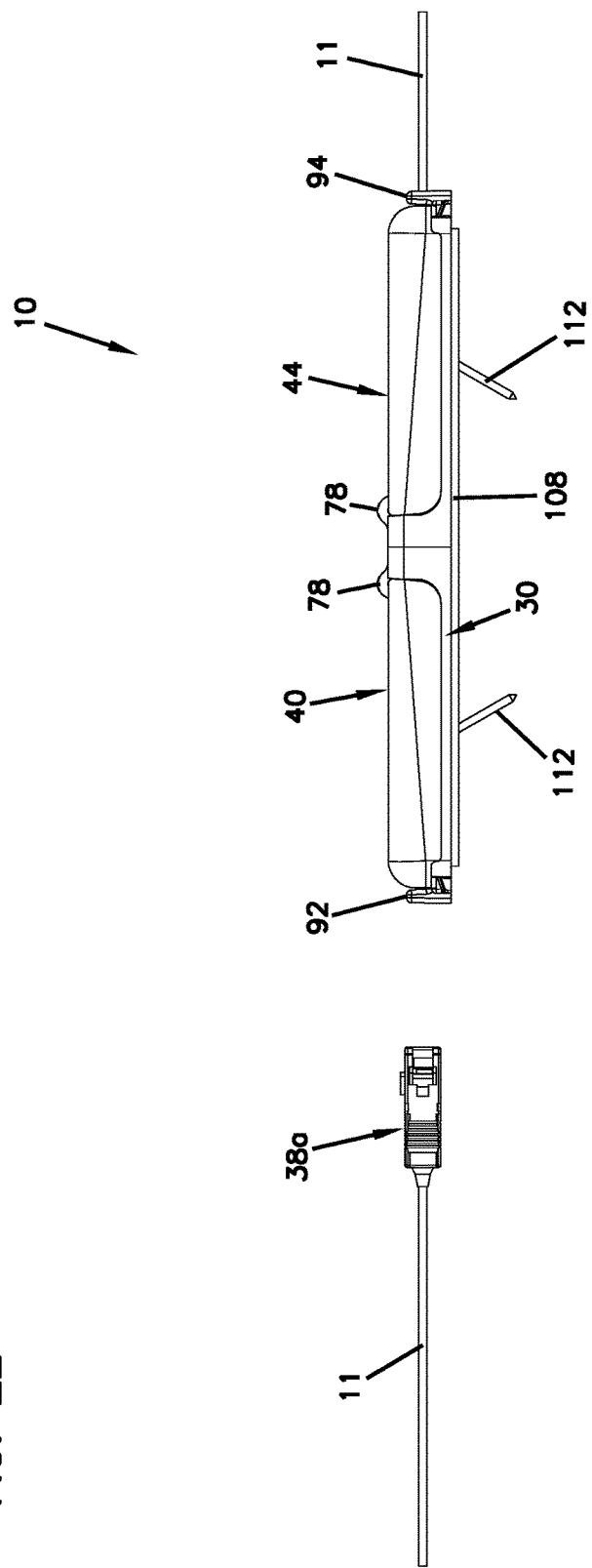
Figure 23:
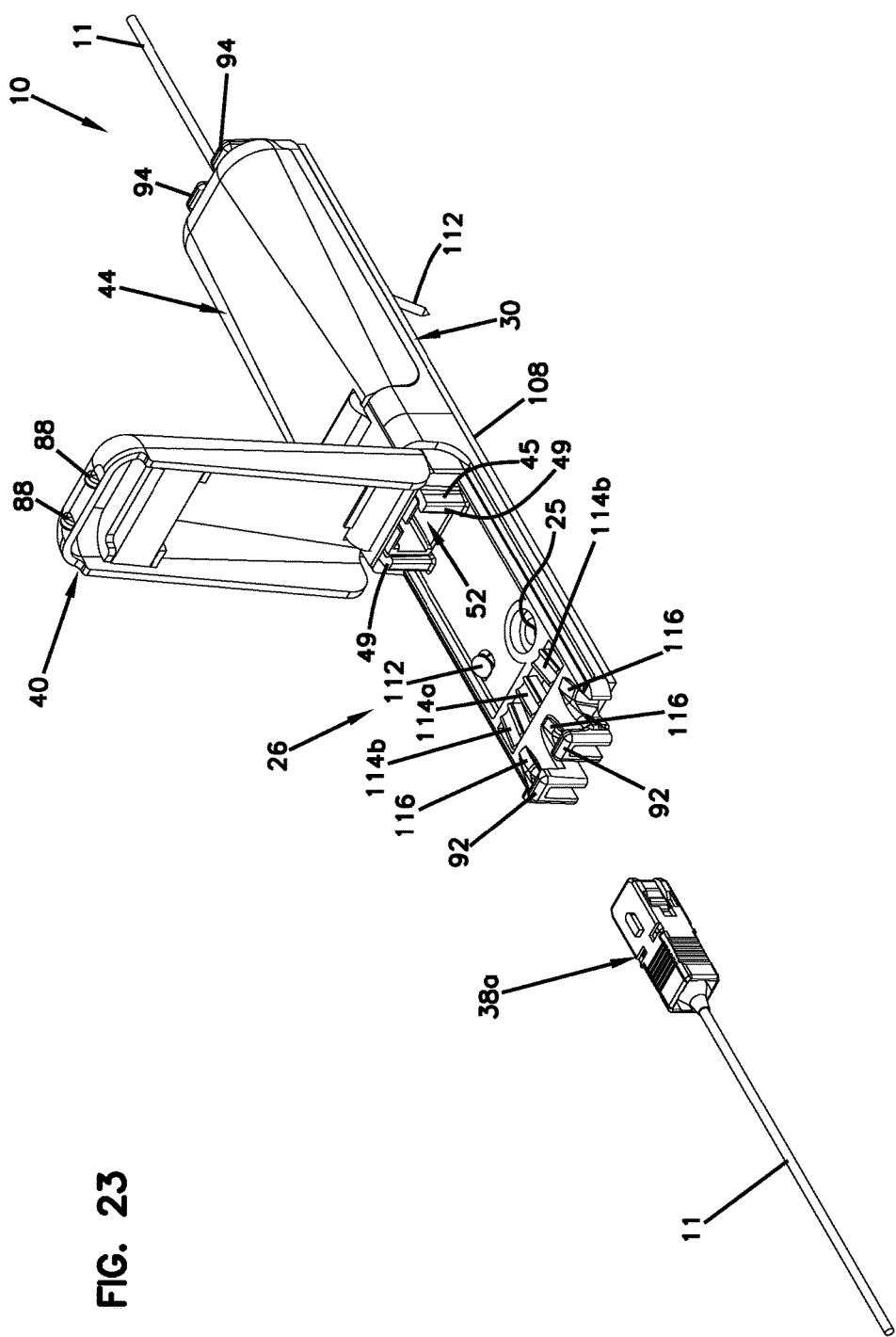
Figure 24:
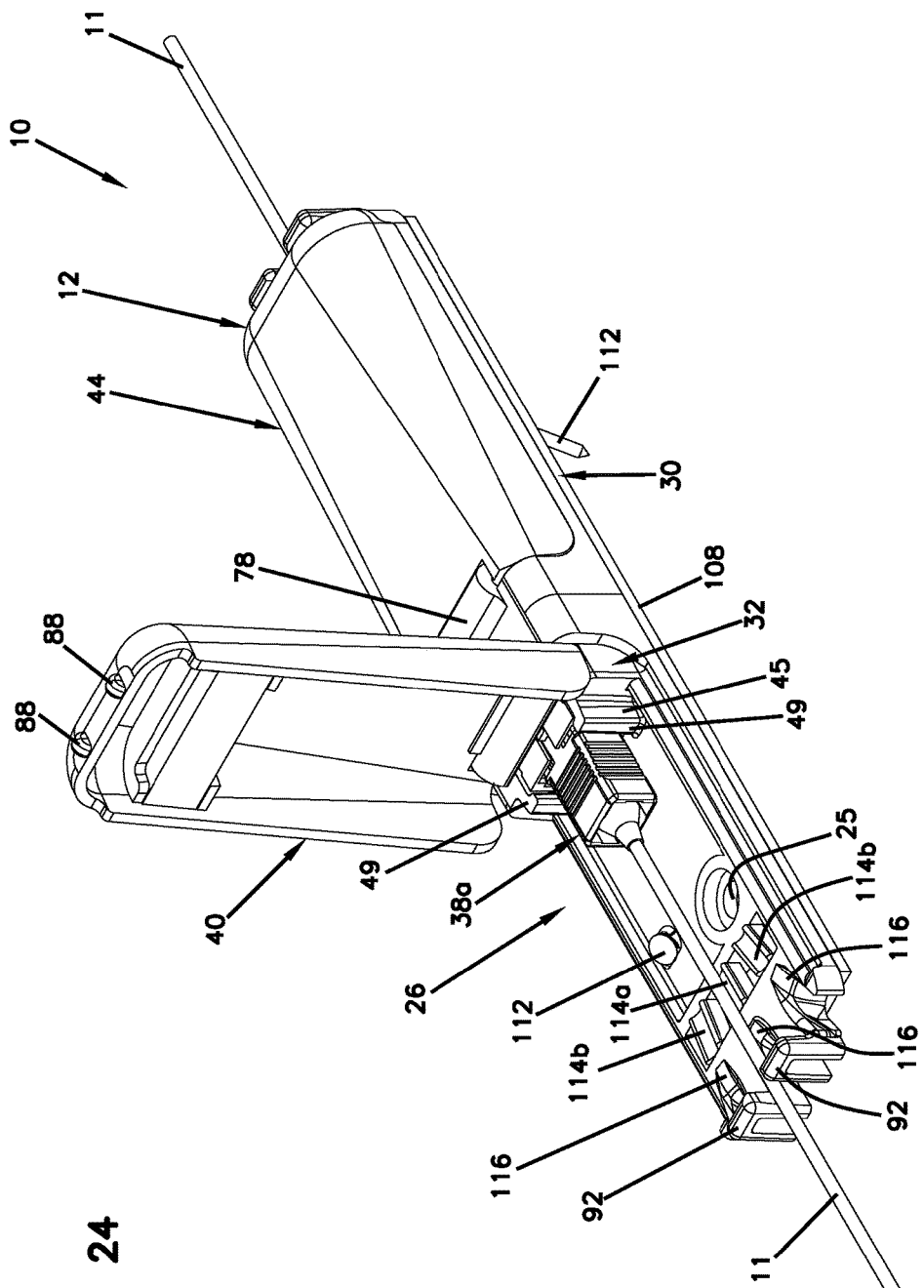
Figure 25:
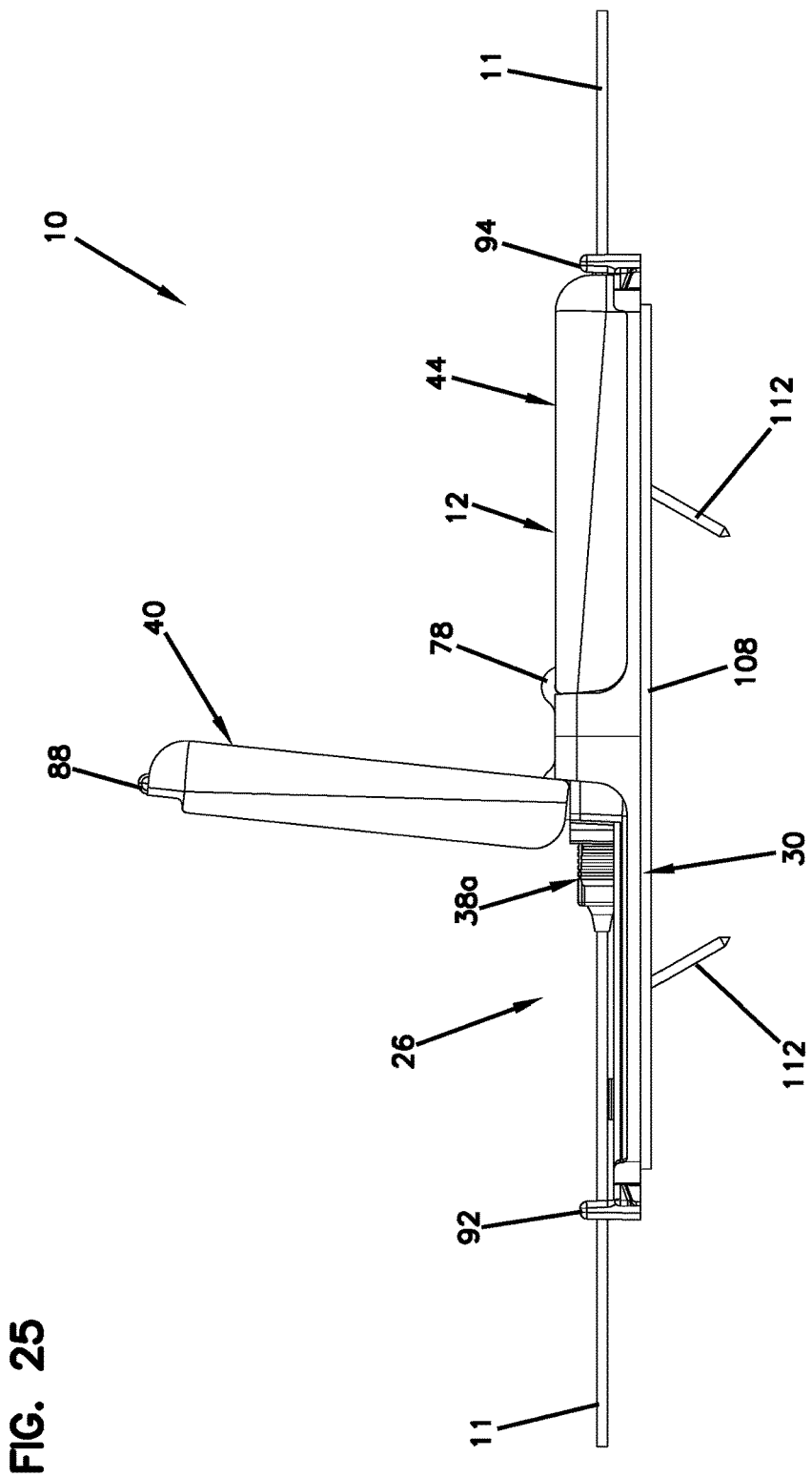
Figure 26:
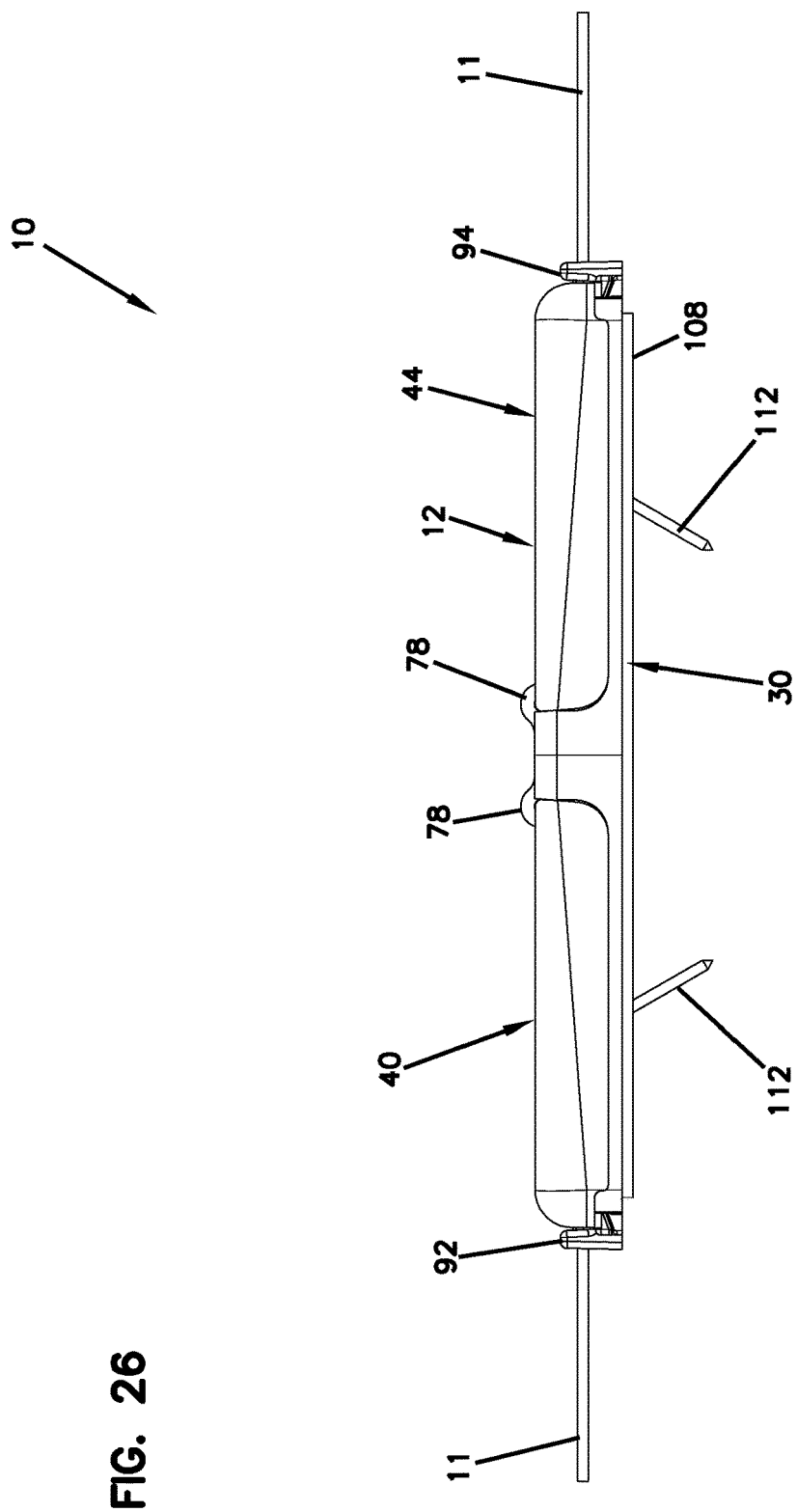
Figure 27:
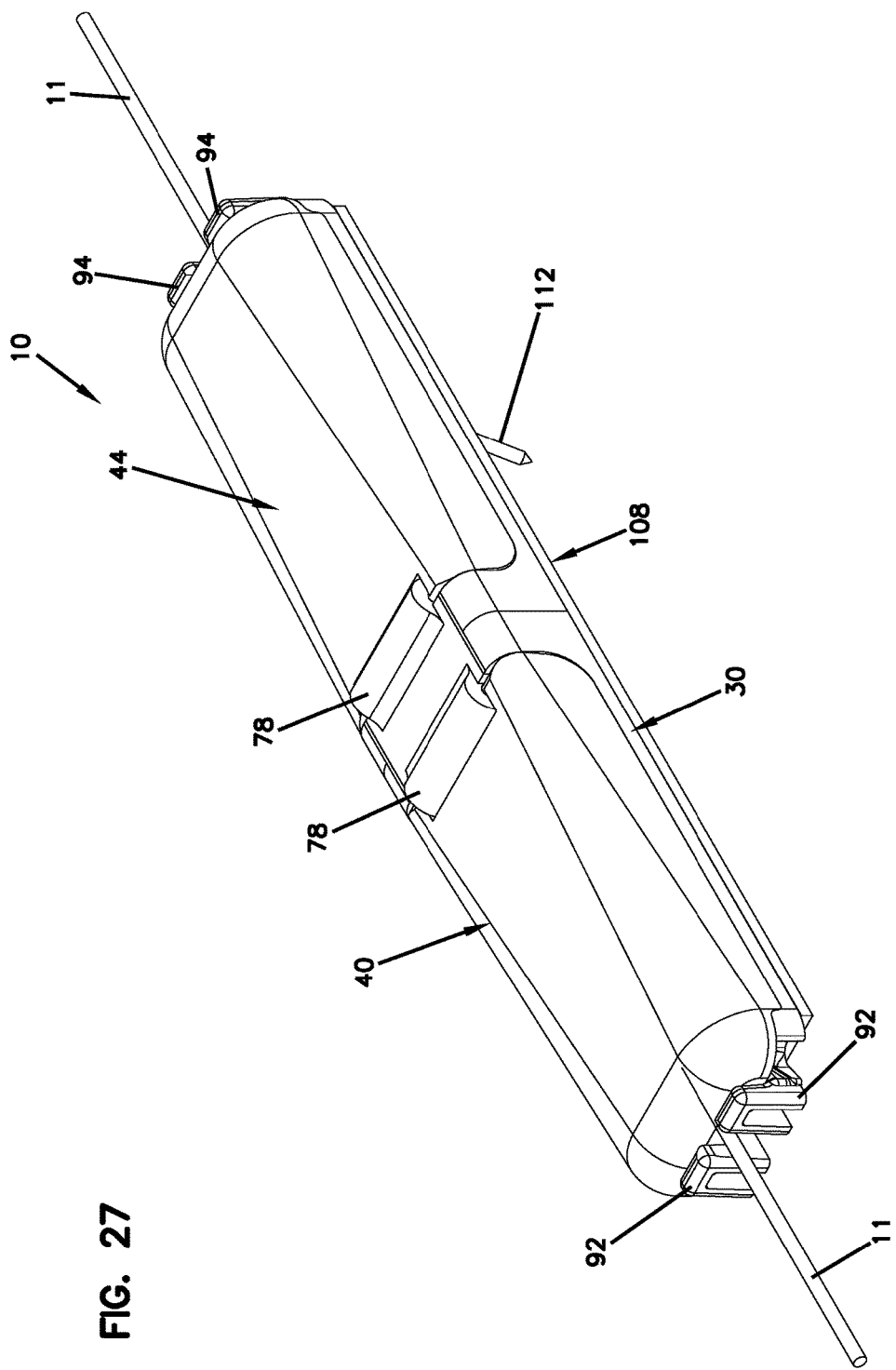

Referring to FIGS. 18-27, both a side view and isometric views are depicted to illustrate installation steps. FIGS. 18 and 19 show the fiber wall jack 10 with the first and second covers 40, 44 in the open position. The fiber optic connector 38b is shown prior to being inserted into a connector port. FIG. 20 shows the fiber optic connector 38b inserted into the connector port of the second connector chamber 28. FIG. 21 shows the first and second covers 40, 44 in the closed position. FIG. 22 shows the fiber optic connector 38a prior to being inserted into the connector port 52 of the first connector chamber 26. FIG. 23 shows the fiber optic connector 38a prior to insertion with the first cover 40 in the open position. FIGS. 24 and 25 show the fiber optic connector 38a installed into the connector port 52 of the first connector chamber 26. FIGS. 26 and 27 show the fiber optic connectors 38a, 38b installed in the fiber wall jack 10 with the first and second covers 40, 44 in the closed position.

The principles, techniques, and features described herein can be applied in a variety of systems, and there is no requirement that all of the advantageous features identified be incorporated in an assembly, system or component to obtain some benefit according to the present disclosure.

From the forgoing detailed description, it will be evident that modifications and variations can be made without departing from the spirit and scope of the disclosure.

What is claimed is:

1. A fiber wall jack comprising:
a housing defining a major axis and a minor axis, the housing having a length measured along the major axis, the length of the housing defining a central location centered between first and second opposite ends of the housing, the major axis and the minor axis being perpendicular relative to one another, the housing being symmetrical about the major axis and the minor axis, the housing being elongated between the first and second ends, the housing also including first and second sides that are intersected by the minor axis and that extend between the first end and the second end of the housing, the housing including a base, the base having a bottom side and a top side, the housing also defining a first connector chamber on the top side of the base of the housing located between the central location and the first end of the housing and a second connector chamber on the top side of the base of the housing located between the central location and the second end of the housing;

the base having a length that extends from the first end of the housing to the second end of the housing, the base also including a width that extends from the first side of the housing to the second side of the housing, the base defining an adapter mount located at the central location;

the housing including a first cover that cooperates with the base to enclose the first connector chamber on the top side of the base of the housing, the first cover being pivotally movable about a first pivot axis between an open position and a closed position, the first pivot axis being located adjacent to the central location such that the first cover is positioned on the top side of the base of the housing between the central location and the first end of the housing;

the housing including a second cover that cooperates with the base to enclose the second connector chamber on the top side of the base of the housing, the second cover being pivotally movable about a second pivot axis between an open position and a closed position, the second pivot axis being located adjacent to the central location such that the second cover is positioned on the top side of the base of the housing between the central location and the second end of the housing; and a fiber optic adapter mounted at the adapter mount, the fiber optic adapter defining a first connector port accessible from the first connector chamber and a second connector port accessible from the second connector chamber, the first and second connector ports being co-axially aligned along the major axis.

2. A fiber wall jack according to claim 1, wherein the housing has a depth that extends along the minor axis from the base to a top surface of the housing.

3. A fiber wall jack according to claim 2, wherein the first cover includes a first cover first side wall that defines a portion of the first side of the housing that corresponds with the first connector chamber, and the first cover includes a first cover second side wall that defines a portion of the second side of the housing that corresponds with the first connector chamber.

4. A fiber wall jack according to claim 3, wherein the first cover first and second side walls each have a dimension that extends a majority of the depth of the housing such that when the first cover is in the open position, side access to the first connector port within the first connector chamber is provided.

5. A fiber wall jack according to claim 3, wherein the first cover further includes a first end wall that extends a majority of the depth such that when the first cover is in the open position end access to the first connector port within the first connector chamber is provided.

6. A fiber wall jack according to claim 5, wherein the first cover includes first lock protrusions arranged on the first end wall thereof.

7. A fiber wall jack according to claim 6, wherein the base includes a first latch portion at the first end that defines a first latch space for receiving the first lock protrusions of the first cover, the first lock protrusions and the first latch portion forming a first latching end.

8. A fiber wall jack according to claim 2, wherein the second cover includes a second cover first side wall that defines a portion of the first side of the housing that corresponds with the second connector chamber, and the second cover includes a second cover second side wall that defines a portion of the second side of the housing that corresponds with the second connector chamber.

9. A fiber wall jack according to claim 8, wherein the second cover first and second side walls each have a dimension that extends a majority of the depth of the housing such that when the second cover is in the open position, side access to the second connector port within the second connector chamber is provided.

10. A fiber wall jack according to claim 9, wherein the second cover further includes a second end wall that extends a majority of the depth such that when the second cover is in the open position end access to the second connector port within the second connector chamber is provided.

11. A fiber wall jack according to claim 10, wherein the second cover includes second lock protrusions arranged on the second end wall thereof.

12. A fiber wall jack according to claim 11, wherein the base includes a second latch portion at the second end that defines a second latch space for receiving the second lock protrusions of the second cover, the second lock protrusions and the second latch portion forming a second latching end.

13. A fiber wall jack according to claim 2, wherein the base includes a side wall having a base depth that extends a minority of the depth of the housing.

14. A fiber wall jack according to claim 13, wherein the side wall of the base has a middle section member that extends the full depth of the housing, the middle section defining a mounting structure.

15. A fiber wall jack according to claim 14, further comprising a retention clip mountable between the middle section member and the adapter mount, the middle section member having latch arms that engage with the retention clip to secure it.

16. A fiber wall jack according to claim 15, wherein the retention clip includes lip portions extending inwardly from opposite side edges thereof to underlie a pivot pin of the first and second covers when respectively associated therewith, the opposing lip portions and the pivot pins forming first and second attachment mechanisms.

17. A fiber wall jack according to claim 16, wherein the lip portions of the retention clip respectively mount the first and second covers for pivotable movement.

18. A fiber wall jack according to claim 16, wherein the retention clip is secured to the base of the housing by snap fit connection.

19. A fiber wall jack according to claim 1, wherein the bottom side of the base has a mounting surface adapted to be adhesively secured to a wall surface through an adhesive bonding layer.

20. A fiber wall jack according to claim 19, wherein one or more channels are formed in the base of each of the first and second connector chambers, each of the channels terminating adjacent a bend radius surface that respectively provides a transition from a front surface of the first and second connector chambers to the base of the housing and down to a location coplanar with the bottom side of the base, and wherein an optical fiber is routed to a wall surface.

21. A fiber wall jack according to claim 20, wherein the base includes tie down locations to secure a portion of the optical fiber located within the channels of the housing.

22. A fiber wall jack according to claim 1, wherein the first and second covers each carry a dust gasket to respectively form an environmental seal within the first and second connector chambers when the first and second covers are in the closed position.

23. A fiber wall jack according to claim 1, wherein the base defines a mounting hole configured to allow a fastener to slide in the mounting hole to anchor the fiber wall jack to a wall surface.

24. A fiber wall jack according to claim 1, wherein the adapter mount includes adapter retention walls with flanges, wherein the flanges extend from the adapter retention walls.

25. A fiber wall jack according to claim 24, wherein the fiber optic adapter snaps into the adapter mount between the adapter retention walls.

* * * * *